United States Patent
Lee et al.

(10) Patent No.: US 12,267,170 B2
(45) Date of Patent: Apr. 1, 2025

(54) METHOD AND DEVICE FOR MANAGING HARQ PROCESS IN NR V2X

(71) Applicant: LG ELECTRONICS INC., Seoul (KR)

(72) Inventors: Jongyoul Lee, Seoul (KR); Youngdae Lee, Seoul (KR); Giwon Park, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 414 days.

(21) Appl. No.: 17/760,703

(22) PCT Filed: Jul. 8, 2020

(86) PCT No.: PCT/KR2020/008883
§ 371 (c)(1),
(2) Date: Mar. 15, 2022

(87) PCT Pub. No.: WO2021/066296
PCT Pub. Date: Apr. 8, 2021

(65) Prior Publication Data
US 2022/0337349 A1    Oct. 20, 2022

(30) Foreign Application Priority Data
May 14, 2020   (KR) .................. 10-2020-0057929

(51) Int. Cl.
*H04L 1/1812* (2023.01)
*H04L 1/1829* (2023.01)
*H04W 72/20* (2023.01)

(52) U.S. Cl.
CPC .......... *H04L 1/1812* (2013.01); *H04L 1/1835* (2013.01); *H04L 1/1854* (2013.01); *H04L 1/1861* (2013.01); *H04W 72/20* (2023.01)

(58) Field of Classification Search
CPC ................. H04L 1/1861; H04L 1/1854; H04L 1/1835; H04L 1/1812; H04W 72/20; H04W 72/25
See application file for complete search history.

(56) References Cited

U.S. PATENT DOCUMENTS

| | | | | |
|---|---|---|---|---|
| 2009/0086845 A1* | 4/2009 | Demirhan | ............. | H04L 1/1607 375/295 |
| 2010/0099429 A1* | 4/2010 | Ishii | ................... | H04W 52/365 455/522 |

(Continued)

OTHER PUBLICATIONS

Partial Machine Translation of KR-10-2019-0080886 (pp. 140-29 and 140-30) (Year: 2019).*

(Continued)

*Primary Examiner* — James P Duffy
(74) *Attorney, Agent, or Firm* — BRYAN CAVE LEIGHTON PAISNER LLP

(57) ABSTRACT

A method for performing wireless communication by a first device is provided. The method may include: receiving, from one or more second devices, one or more physical sidelink control channels (PSCCHs); receiving, from the one or more second devices, one or more physical sidelink shared channels (PSSCHs) related to the one or more PSCCHs; and performing one or more hybrid automatic repeat request (HARQ) process related to the one or more PSSCHs with the one or more second devices.

20 Claims, 24 Drawing Sheets

(56) References Cited

U.S. PATENT DOCUMENTS

| | | | |
|---|---|---|---|
| 2017/0215183 A1 | 7/2017 | Gulati et al. | |
| 2017/0289995 A1* | 10/2017 | Lin | H04W 72/23 |
| 2019/0103951 A1* | 4/2019 | Park | H04W 72/0446 |
| 2020/0053768 A1* | 2/2020 | Chen | H04W 88/04 |
| 2020/0304247 A1* | 9/2020 | Loehr | H04L 1/1822 |
| 2020/0351033 A1* | 11/2020 | Ryu | H04L 1/1861 |

OTHER PUBLICATIONS

Lenovo et al., "SL HARQ operation", R2-1910086, 3GPP TSG RAN WG2 Meeting #107, Prague, Czech Republic, Aug. 26-30, 2019, see section 2.

Huawei et al., "Sidelink resource allocation mode 2 for NR V2X", R1-1908042, 3GPP TSG RAN WG1 Meeting #98, Prague, Czech Republic, Aug. 26-30, 2019, see section 2.2.

Ericsson, "Coordination for HARQ feedback in groupcast", R2-1910299, 3GPP TSG-RAN WG2 #107, Prague, Czech, Aug. 26-30, 2019, see section 2.

Lenovo et al., "HARQ feedback impact on RAN2", R2-1912565, 3GPP TSG RAN WG2 #107bis, Chongqin, PRC, Oct. 14-18, 2019, see section 2.

CATT, "Discussion on resource allocation mechanism for sidelink Mode 2 in NR V2X ", 3GPP TSG RAN WG1 Meeting #98 Prague, CZ, Aug. 26-30, 2019, R1-1908581.

* cited by examiner (a)

(b)

(a)

(b)

METHOD AND DEVICE FOR MANAGING HARQ PROCESS IN NR V2X

This application is the National Stage filing under 35 U.S.C. 371 of International Application No. PCT/KR2020/008883, filed on Jul. 8, 2020, which claims the benefit of and priority to U.S. Provisional Application No. 62/910,399, filed on Oct. 3, 2019, U.S. Provisional Application No. 62/914,550, filed on Oct. 13, 2019 and Korean Application No. 10-2020-0057929, filed on May 14, 2020, the contents of which are all hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in NR V2X, depending on the introduction of hybrid automatic repeat request (HARQ), rules on the HARQ process may be required. That is, for example, a rule related to the maximum number of HARQ processes (or HARQ process IDs) that can be managed by a V2X terminal and a rule related to how to manage HARQ processes (or HARQ process IDs) according to each cast type may be required.

Technical Solutions

According to an embodiment of the present disclosure, there is provided a method of performing wireless communication by a first device. The method may include receiving, from one or more second devices, one or more physical sidelink control channels (PSCCHs), receiving, from the one or more second devices, one or more physical sidelink shared channels (PSSCHs) related to the one or more PSCCHs, and performing one or more hybrid automatic repeat request (HARQ) process related to the one or more PSSCHs with the one or more second devices. For example, the one or more HARQ processes may be configured based on at least one of a cast type or a resource allocation mode related to one HARQ entity.

Effects of the Disclosure

A UE may effectively perform sidelink communication.

DESCRIPTION OF EXEMPLARY EMBODIMENTS

Figure 1:
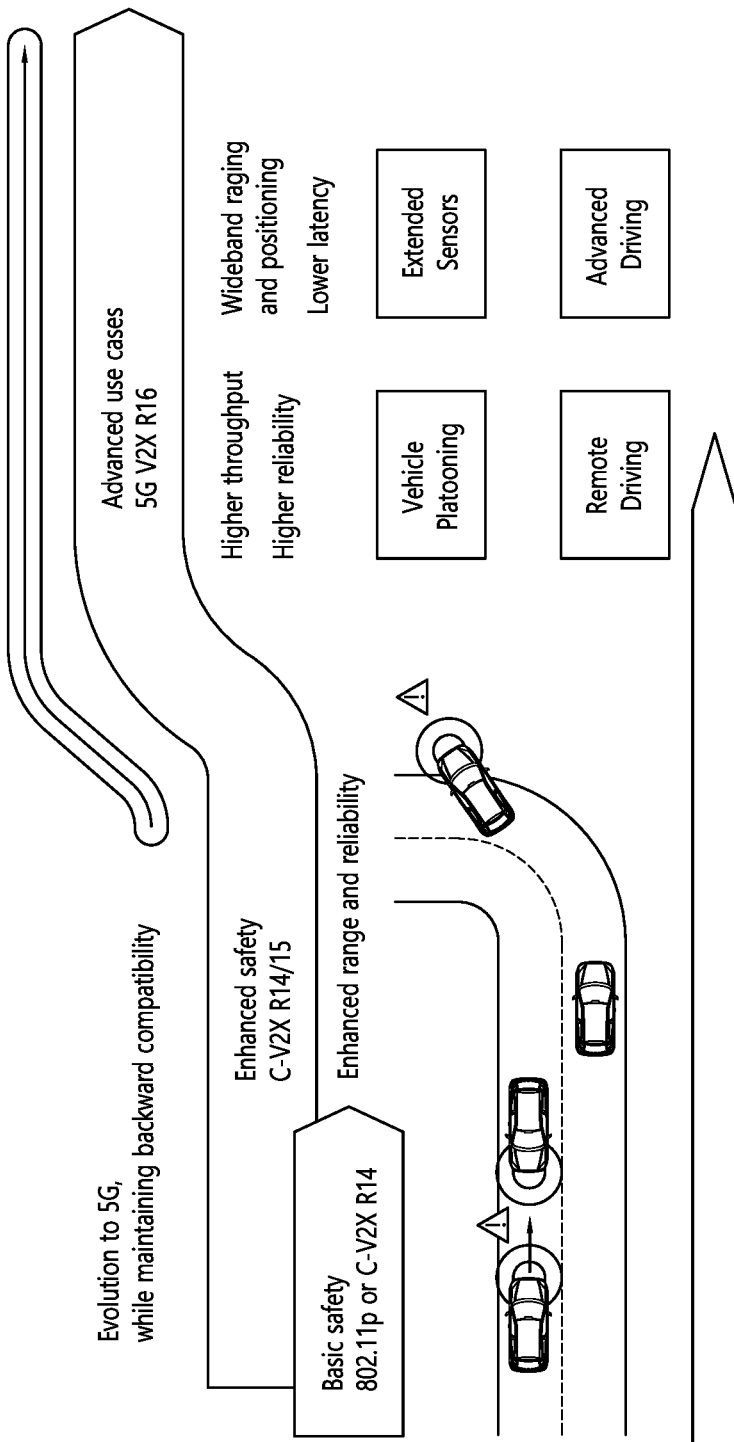
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
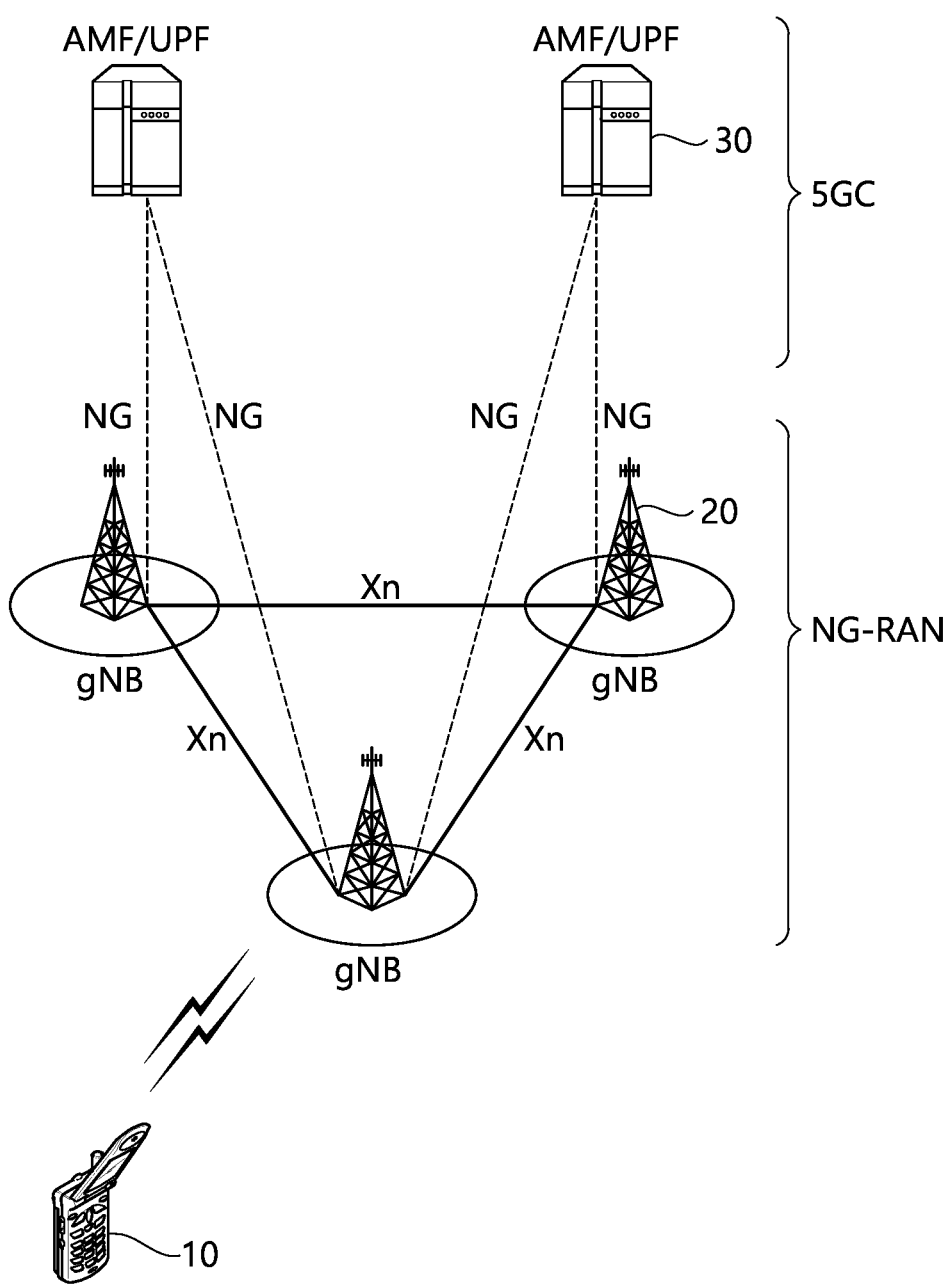
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
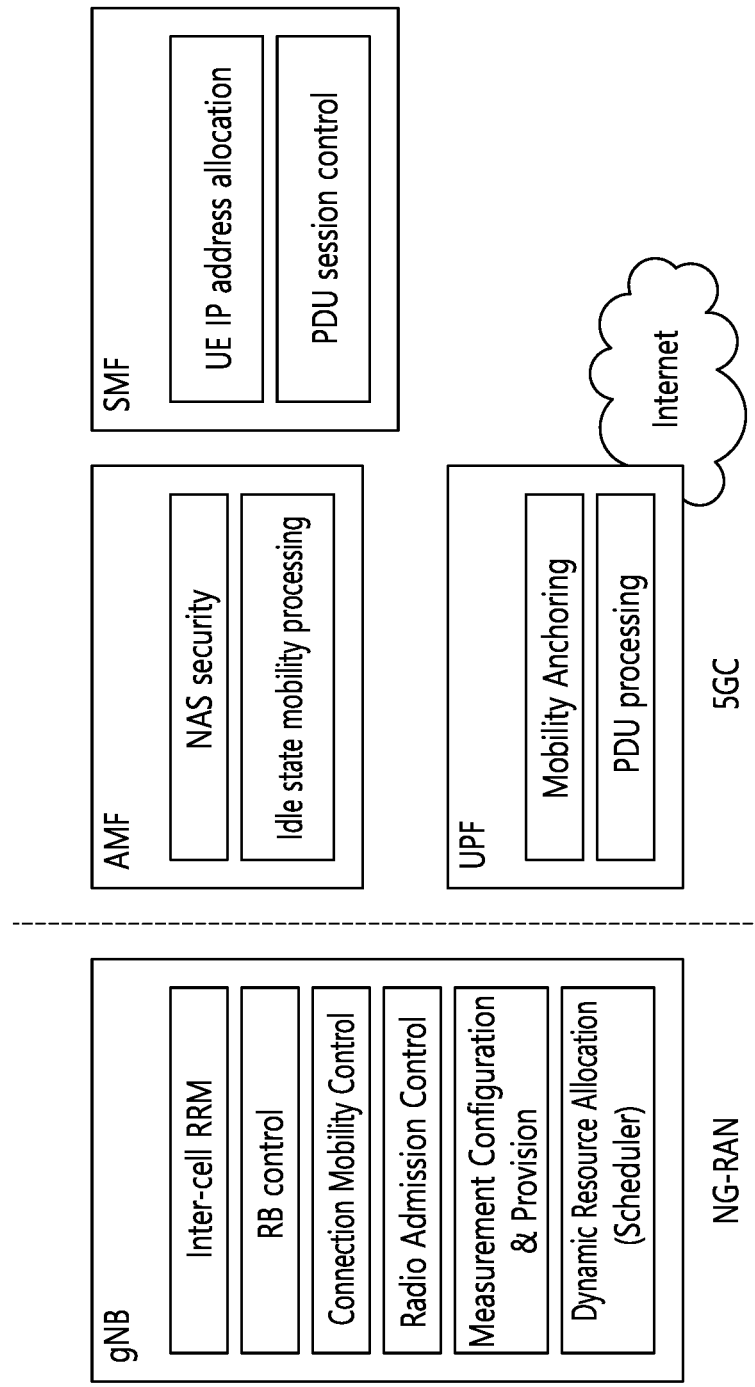
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4:
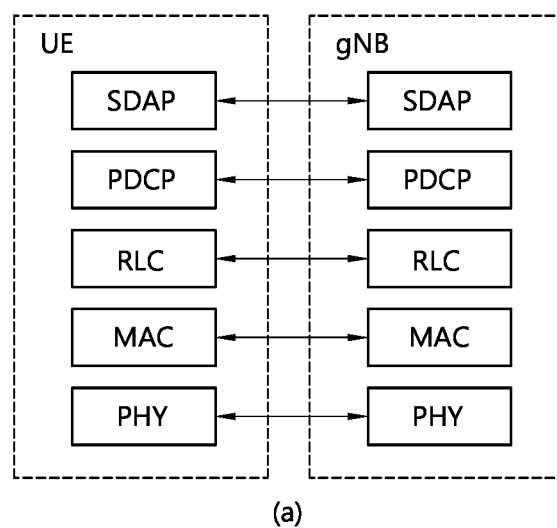
FIG. 4 shows a radio protocol architecture, in accordance with an embodiment of the present disclosure.
Figure 4:
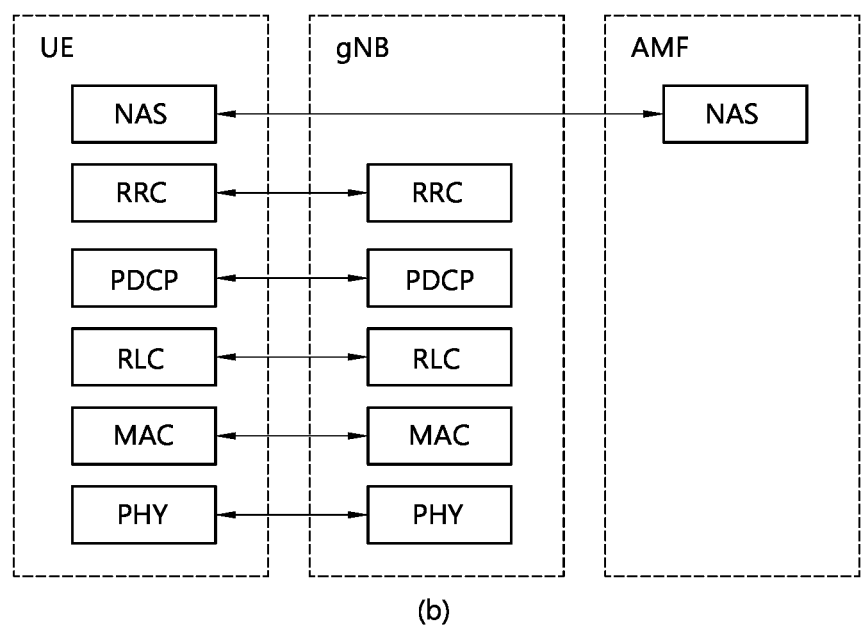

FIG. 4 shows a radio protocol architecture, in accordance with an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
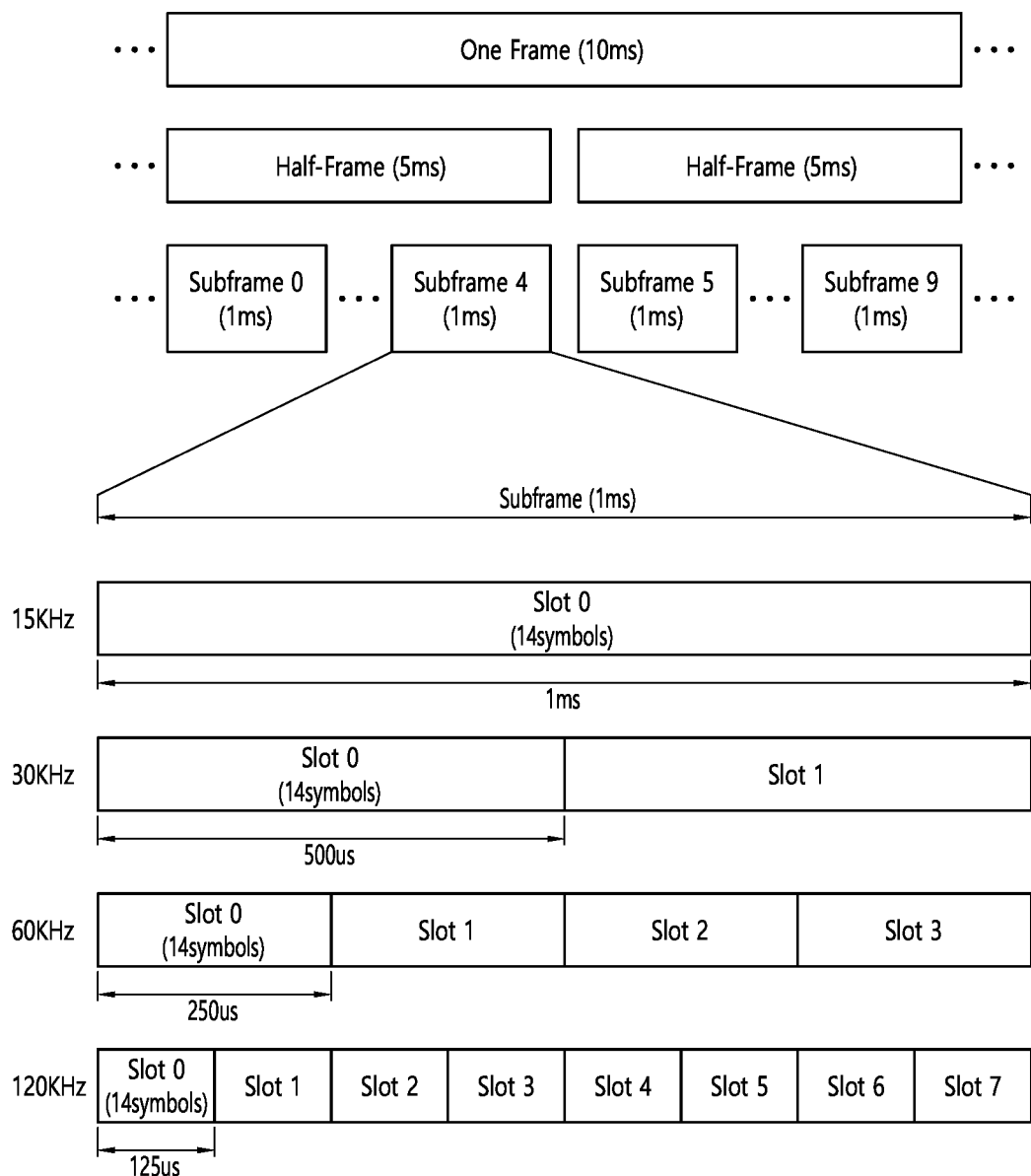
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15*$2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15*$2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
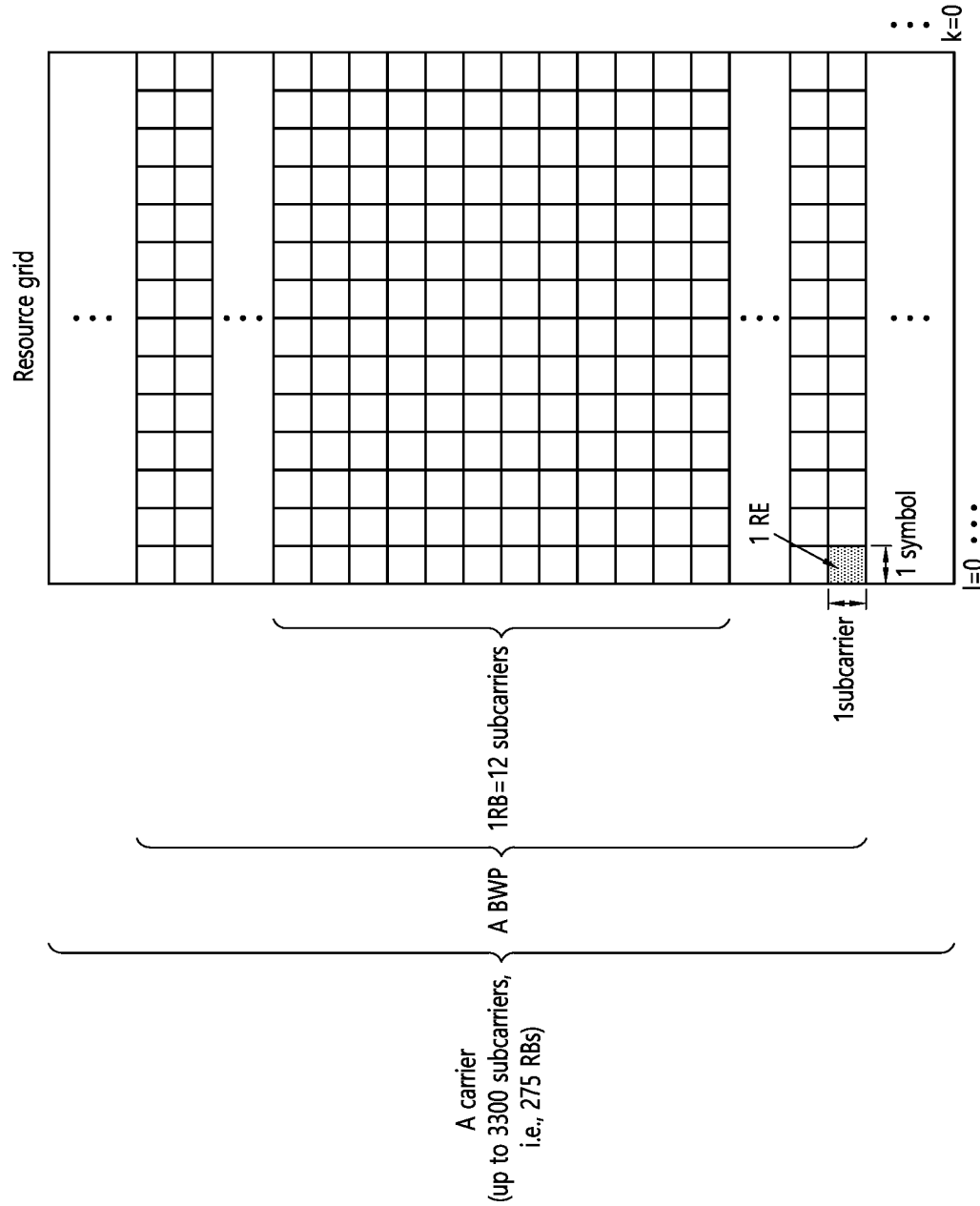
FIG. 6 shows a structure of a slot of an NR frame, in accordance with an embodiment of the present disclosure.

FIG. 6 shows a structure of a slot of an NR frame, in accordance with an embodiment of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
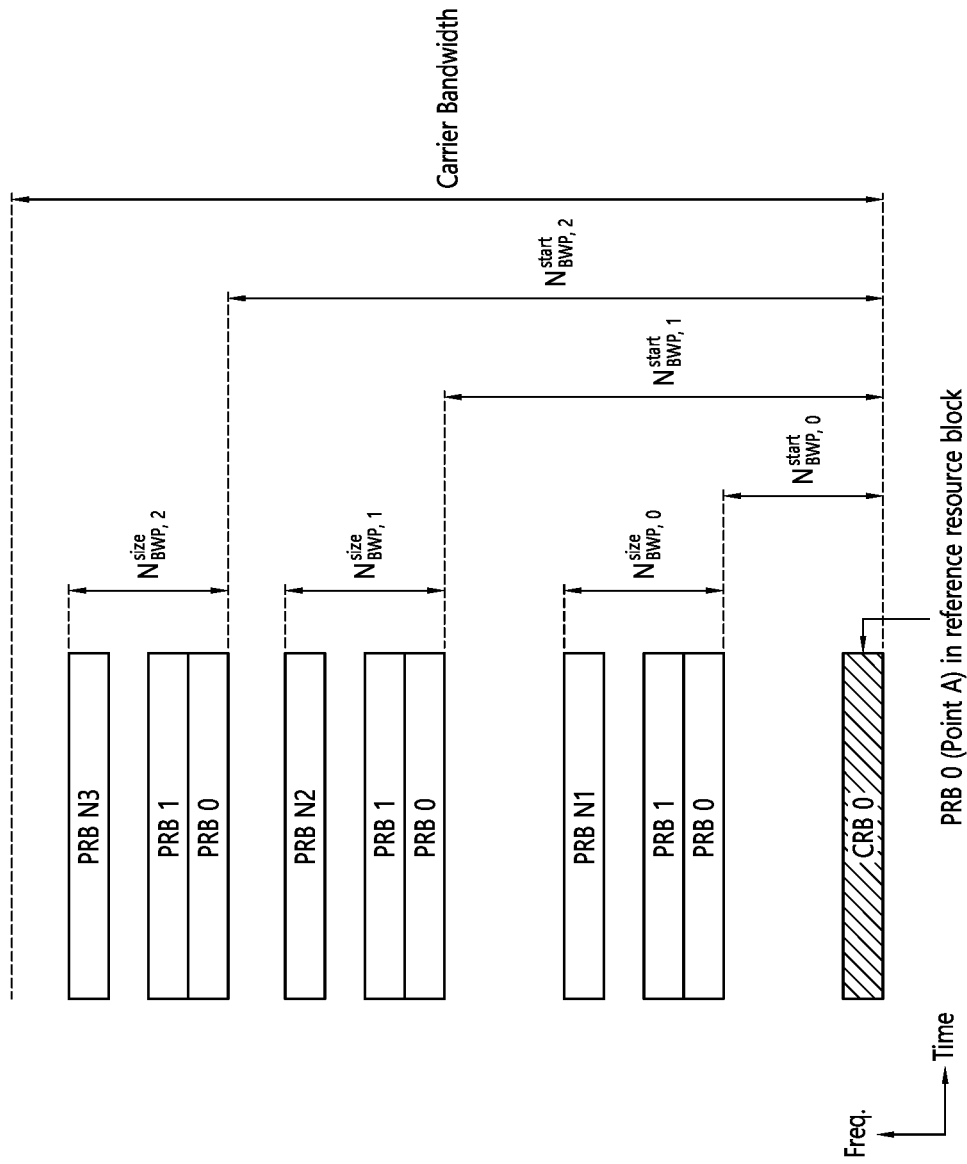
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8:
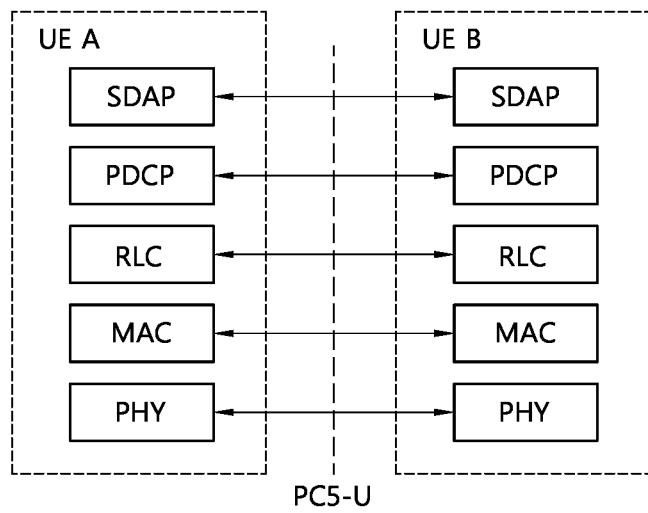
FIG. 8 shows a radio protocol architecture for a SL communication, in accordance with an embodiment of the present disclosure.
Figure 8:
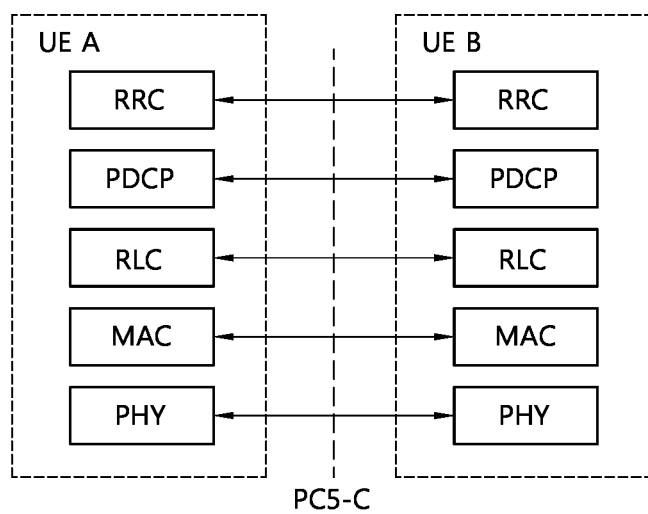

FIG. 8 shows a radio protocol architecture for a SL communication, in accordance with an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
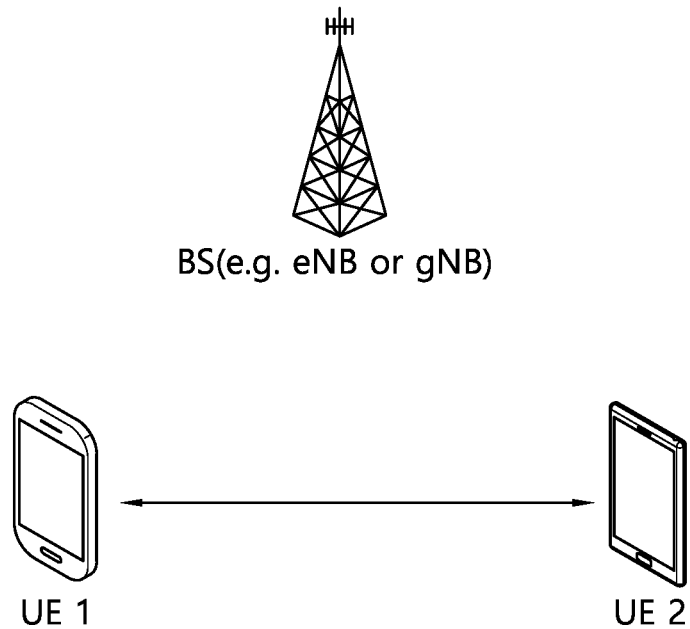
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
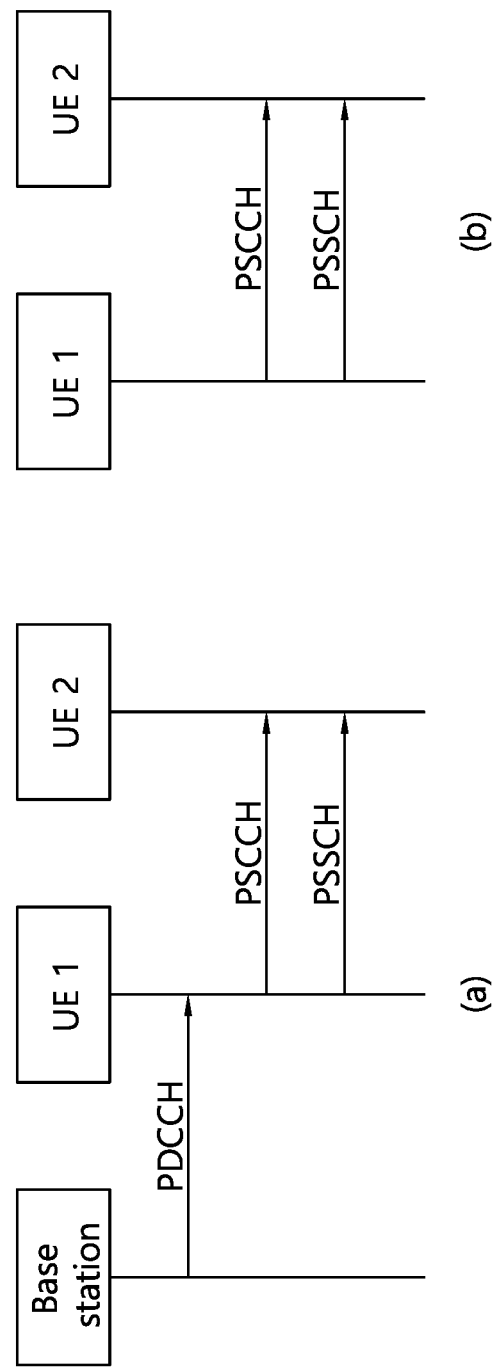
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
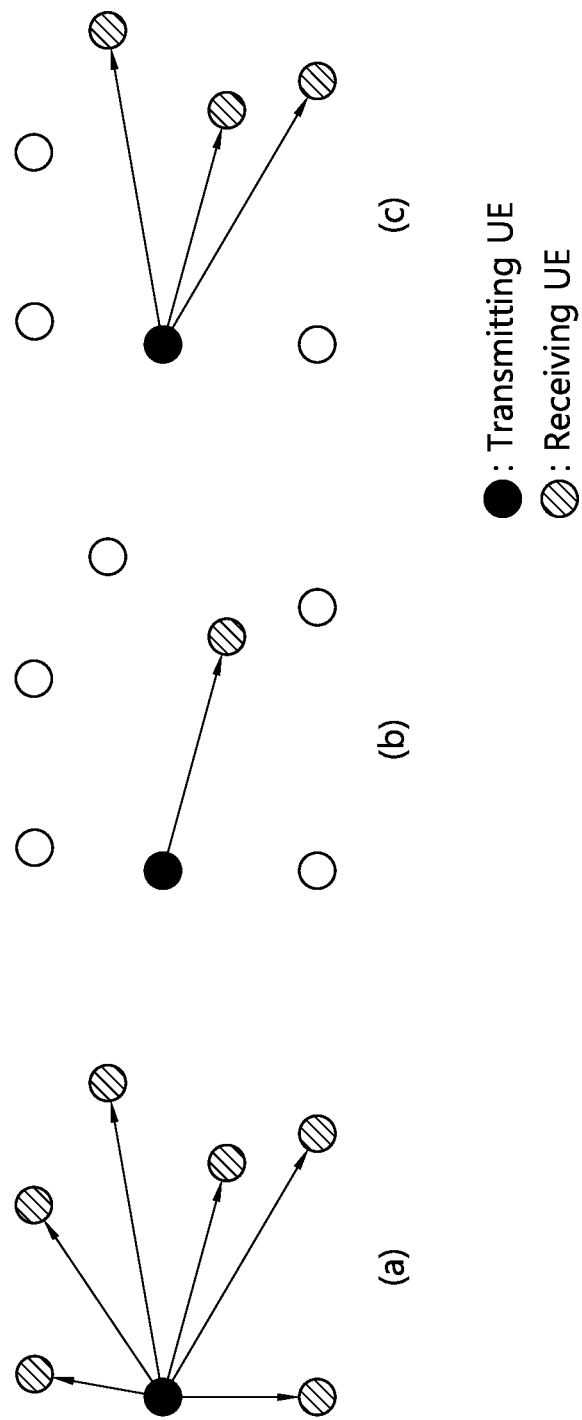
FIG. 11 shows three cast types, in accordance with an embodiment of the present disclosure.

FIG. 11 shows three cast types, in accordance with an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like. Hereinafter, a hybrid automatic repeat request (HARQ) procedure will be described.

An error compensation scheme is used to secure communication reliability. Examples of the error compensation scheme may include a forward error correction (FEC) scheme and an automatic repeat request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

When the SL HARQ feedback is enabled for unicast, in a non-code block group (non-CBG) operation, if the receiving UE successfully decodes a transport block, the receiving UE may generate HARQ-ACK. In addition, the receiving UE may transmit the HARQ-ACK to the transmitting UE. If the receiving UE cannot successfully decode the corresponding transport block after decoding the PSCCH, which targets the receiving UE, the receiving UE may generate the HARQ-NACK. In addition, the receiving UE may transmit HARQ-NACK to the transmitting UE.

When the SL HARQ feedback is enabled for groupcast, the UE may determine whether or not to transmit HARQ feedback based on a TX-RX distance and/or RSRP. In the non-CBG operation, two HARQ feedback options may be supported for groupcast.

(1) Option 1: After the receiving UE decodes a related PSCCH, if the receiving UE fails to decode the corresponding transport block, the receiving UE may transmit a HARQ-NACK over the PSFCH. Otherwise, the receiving UE may not transmit a signal on the PSFCH.

(2) Option 2: If the receiving UE successfully decodes the corresponding transport block, the receiving UE may transmit a HARQ-NACK on the PSFCH. After the receiving UE decodes a related PSCCH targeting the receiving UE, if the receiving UE fails to successfully decode the corresponding transport block, the receiving UE may transmit a HARQ-NACK on the PSFCH.

In case of Resource Allocation Mode 1, a time between the HARQ feedback transmission on the PSFCH and the PSSCH may be (pre-)configured. In case of unicast and groupcast, if retransmission is needed in the sidelink, this may be indicated, to the base station, by a UE existing within a coverage using a PUCCH. The transmitting UE may also transmit an indication to a service base station of the transmitting UE in the form of a Scheduling Request (SR)/Buffer Status Report (BSR) and not in the form of a HARQ ACK/NACK. Additionally, even if the base station does not receive the indication, the base station may schedule a sidelink retransmission resource to the UE.

In case of Resource Allocation Mode 2, a time between the HARQ feedback transmission on the PSFCH and the PSSCH may be (pre-)configured.

Meanwhile, in NR V2X, when the UE performs unicast communication or groupcast communication with another UE, in order to increase reliability of information transmitted to another UE, the UE may transmit a HARQ-ACK/NACK signal for the information as a feedback signal.

Meanwhile, in NR V2X, depending on the introduction of HARQ, rules on the HARQ process may be required. That is, for example, a rule related to the maximum number of HARQ processes (or HARQ process IDs) that can be managed by a V2X UE and a rule related to how to manage HARQ processes (or HARQ process IDs) according to each cast type may be required.

In the present disclosure, a method of configuring a HARQ process according to a cast type in NR V2X is proposed, and a termination condition of a specific HARQ process is proposed.

First, how to configure the HARQ process based on the cast type (e.g., unicast, groupcast, broadcast) or a specific V2X mode (e.g., resource allocation mode 1, resource allocation mode 2) will be described. In NR V2X, the cast type may include unicast, groupcast, and broadcast. For example, the HARQ process may be defined for each cast type. For example, a total HARQ process is defined for a HARQ entity, and the UE may determine the number of HARQ processes for each cast type in the total HARQ process. In addition, similarly, an independent HARQ process may be defined based on each resource allocation mode. On the other hand, for example, in the total HARQ process, the UE may determine the HARQ process for each resource allocation mode.

Figure 12:
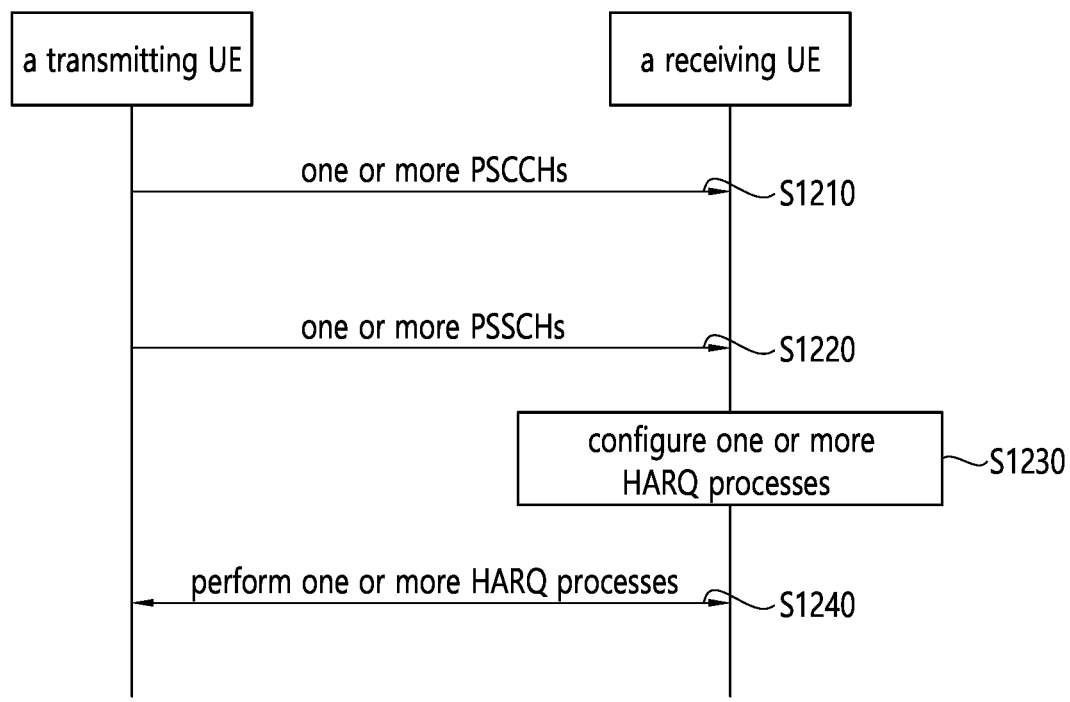
FIG. 12 shows a procedure in which a transmitting terminal performs a HARQ process with a receiving terminal based on a configuration related to the HARQ process according to an embodiment of the present disclosure.

FIG. 12 shows a procedure in which a transmitting UE performs a HARQ process with a receiving UE based on a configuration related to the HARQ process according to an embodiment of the present disclosure. The embodiment of FIG. 12 may be combined with various embodiments of the present disclosure.

Referring to FIG. 12, in step S1210, the transmitting UE may transmit one or more PSCCHs to the receiving UE. For example, the transmitting UE may transmit sidelink control information to the receiving UE on one or more PSCCHs. In step S1220, the transmitting UE may transmit one or more PSSCHs to the receiving UE. For example, the transmitting UE may transmit a sidelink packet on one or more PSSCHs.

For example, the transmitting UE may transmit one or more sidelink packets on one or more PSSCHs. For example, the transmitting UE may transmit one or more PSSCHs related to one or more PSCCHs to the receiving UE. For example, the transmitting UE may transmit one or more PSSCHs related to sidelink control information to the receiving UE.

In step S1230, the receiving UE may configure one or more HARQ processes. For example, the receiving UE may configure or determine one or more HARQ processes related to one or more PSSCHs. For example, the receiving UE may determine whether to share or independently configure the HARQ process managed by one HARQ entity based on the cast type or the resource allocation mode.

According to an embodiment of the present disclosure, the HARQ process may be shared based on the cast type or the V2X resource allocation mode per HARQ entity. For example, the UE may share the HARQ process based on the cast type or the V2X resource allocation mode per HARQ entity. For example, one HARQ entity may exist in a SL carrier. For example, the UE may determine the HARQ process managed by one HARQ entity. For example, the UE may configure or determine the number of HARQ processes managed by one HARQ entity. For example, the HARQ process configured or determined for one HARQ entity may be configured in common (e.g., the number of HARQ processes is 8), and the UE may determine which cast type or which resource allocation mode to perform the HARQ process for each HARQ process by the implementation of which UE in the configuration of the HARQ process. For example, the UE may perform the HARQ process based on the cast type or the resource allocation mode within the number of HARQ processes commonly configured for one HARQ entity. In this case, the UE may flexibly manage the HARQ process in the cast type or resource allocation mode of the currently performed service. In addition, when the UE cannot achieve the maximum throughput to be achieved in a specific cast type or a specific resource allocation mode with one HARQ process, the UE may achieve the maximum throughput by using another HARQ process shared by one HARQ entity.

According to an embodiment of the present disclosure, the HARQ process may be independently configured or determined based on a cast type or V2X resource allocation mode per HARQ entity. For example, the UE may independently configure or determine the HARQ process for one HARQ entity based on a cast type or a resource allocation mode. For example, the number of HARQ processes for a specific cast type or a specific resource allocation mode may be pre-configured for one HARQ entity. For example, the UE may configure or determine the number of HARQ processes for one HARQ entity based on a cast type or a resource allocation mode. For example, the HARQ process may be defined for each cast type or each resource allocation mode for the entire HARQ process managed by one HARQ entity. For example, the UE may configure or determine the HARQ process for each cast type or each resource allocation mode for the entire HARQ process managed by the HARQ entity. For example, if there are 8 total HARQ processes managed by one HARQ entity, the UE may configure or determine the number of HARQ processes to 3 unicasts, 2 groupcasts, and 2 broadcasts. For example, the HARQ process may be independently defined for one HARQ entity based on a cast type or a resource allocation mode. For example, the UE may independently manage the HARQ process for a cast type or a resource allocation mode in one HARQ entity. For example, in relation to the HARQ process managed by one HARQ entity, multiple HARQ processes for specific functions such as 8 unicasts, 8 groupcasts, and 8 broadcasts (or 8 for each resource allocation mode) may be defined. For example, the UE may configure or determine the HARQ process managed by one HARQ entity to a plurality of HARQ processes (e.g., 8) for a specific function (e.g., cast type or resource allocation mode).

For example, the HARQ process may be managed, based on the combination of the cast type and the V2X resource allocation mode, per HARQ entity. For example, the UE may configure or determine the HARQ process, based on the combination of the cast type entity and the V2X resource allocation mode, per HARQ. That is, for example, the HARQ process may be shared or independently exist based on a combination of a specific cast type and a specific resource allocation mode.

In addition, for example, the UE may determine whether to share or independently configure the HARQ process managed by one HARQ entity based on the cast type or the resource allocation mode.

In step S1240, the transmitting UE and the receiving UE may perform one or more HARQ processes. For example, the receiving UE may perform configured one or more HARQ processes in response to one or more PSSCHs for the transmitting UE. For example, the receiving UE may perform configured HARQ process based on the cast type or the resource allocation mode for the transmitting UE in response to one or more PSSCHs.

According to various embodiments of the present disclosure, the UE may terminate a specific HARQ process that satisfies a termination condition for the HARQ process among one or more HARQ processes. For example, when to terminate a specific HARQ process among one or more HARQ processes may be defined. Herein, for example, the termination of the HARQ process may be an operation of releasing a specific HARQ process. For example, the termination of the HARQ process may be an operation of flushing a buffer of a specific HARQ process.

Hereinafter, a method for the transmitting UE to terminate the HARQ process with the receiving UE based on the termination condition related to the HARQ process will be described.

Figure 13:
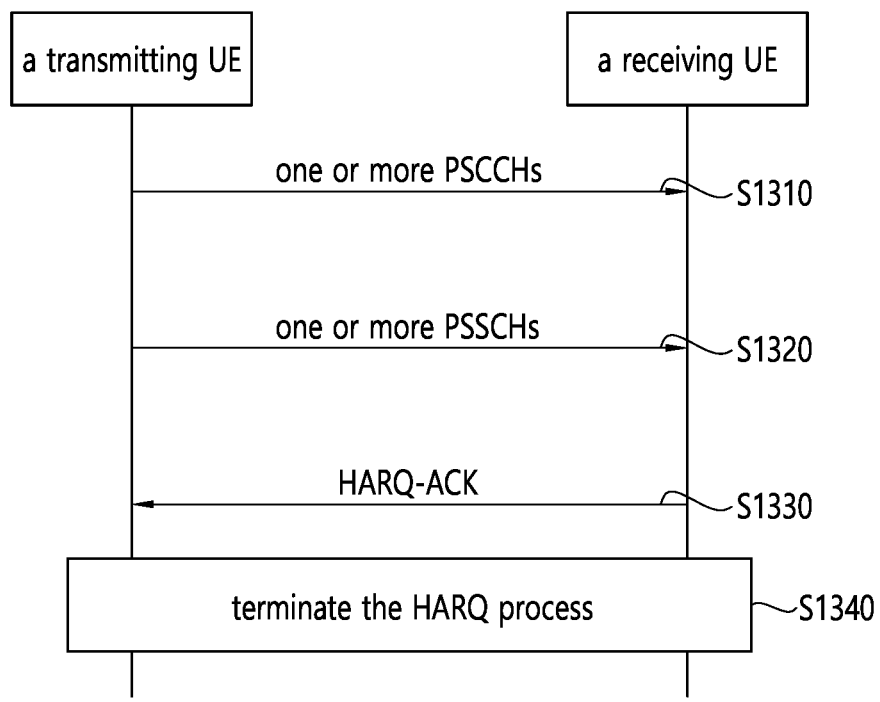
FIG. 13 shows a procedure for terminating a HARQ process with a receiving terminal based on a transmitting terminal receiving the HARQ-ACK according to an embodiment of the present disclosure.

FIG. 13 shows a procedure for terminating a HARQ process with a receiving UE based on a transmitting UE receiving the HARQ-ACK according to an embodiment of the present disclosure. The embodiment of FIG. 13 may be combined with various embodiments of the present disclosure.

Referring to FIG. 13, in step S1310, the transmitting UE may transmit one or more PSCCHs to the receiving UE. For example, the transmitting UE may transmit sidelink control information to the receiving UE on one or more PSCCHs. In step S1320, the transmitting UE may transmit one or more PSSCHs to the receiving UE. For example, the transmitting UE may transmit a sidelink packet on one or more PSSCHs. For example, the transmitting UE may transmit one or more sidelink packet on one or more PSSCHs. For example, the transmitting UE may transmit one or more PSSCHs related to one or more PSCCHs to the receiving UE. For example, the transmitting UE may transmit one or more PSSCHs related to one or more sidelink control information to the receiving UE.

In step S1330, the transmitting UE may receive the HARQ-ACK from the receiving UE. For example, the receiving UE may transmit a HARQ feedback to the transmitting UE in response to one or more PSSCHs. For example, when the receiving UE succeeds in decoding one or more PSSCHs, the receiving UE may transmit a HARQ- ACK to the transmitting UE. For example, the receiving UE may transmit one or more HARQ feedbacks to the transmitting UE in response to one or more PSSCHs.

According to an embodiment of the present disclosure, when the transmitting UE receives a HARQ-ACK from the receiving UE, the corresponding HARQ process may be terminated. For example, the transmitting UE may receive, from the receiving UE, parameters (e.g., HARQ process ID, new data indicator (NDI)) related to a HARQ for the transmitted data or the transmitted PSSCH, together with the HARQ feedback.

In step S1340, the transmitting UE and the receiving UE may terminate the HARQ process. For example, when the receiving UE transmits a HARQ-ACK in response to one or more PSSCHs, the receiving UE may terminate the corresponding HARQ process. For example, when the transmitting UE receives a HARQ-ACK in response to one or more PSSCHs, the transmitting UE may terminate the corresponding HARQ process.

Figure 14:
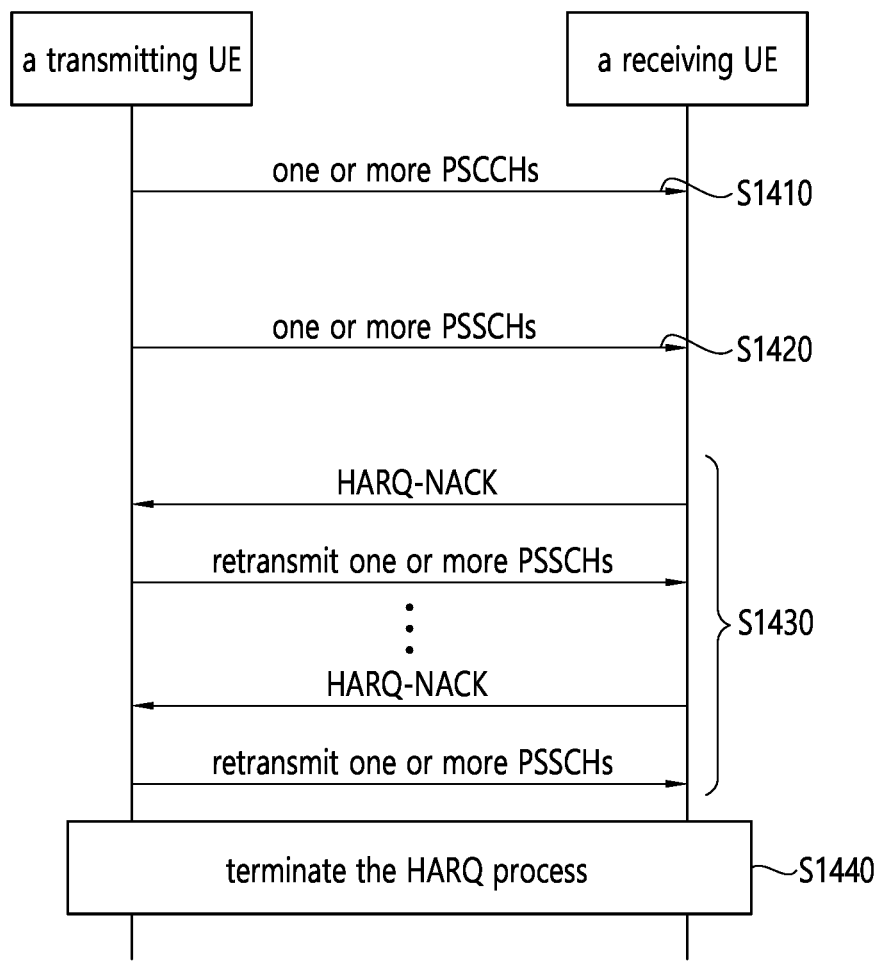
FIG. 14 shows a procedure for terminating a HARQ process with a receiving terminal based on a transmitting terminal that has performed maximum retransmission related to a PSSCH according to an embodiment of the present disclosure.

FIG. 14 shows a procedure for terminating a HARQ process with a receiving UE based on a transmitting UE that has performed maximum retransmission related to a PSSCH according to an embodiment of the present disclosure. The embodiment of FIG. 14 may be combined with various embodiments of the present disclosure.

Referring to FIG. 14, in step S1410, the transmitting UE may transmit one or more PSCCHs to the receiving UE. For example, the transmitting UE may transmit sidelink control information to the receiving UE on one or more PSCCHs. In step S1420, the transmitting UE may transmit one or more PSSCHs to the receiving UE. For example, the transmitting UE may transmit a sidelink packet on one or more PSSCHs. For example, the transmitting UE may transmit one or more sidelink packet on one or more PSSCHs. For example, the transmitting UE may transmit one or more PSSCHs related to one or more PSCCHs to the receiving UE. For example, the transmitting UE may transmit one or more PSSCHs related to one or more sidelink control information to the receiving UE.

In step S1430, the transmitting UE may receive one or more HARQ-NACKs from the receiving UE, and may retransmit one or more PSSCHs to the receiving UE. For example, the receiving UE may transmit HARQ feedback to the transmitting UE in response to one or more PSSCHs. For example, when the receiving UE fails to decode one or more PSSCHs, the receiving UE may transmit one or more HARQ-NACKs to the transmitting UE. For example, when the transmitting UE receives the HARQ-NACK, the transmitting UE may retransmit a PSSCH related to the HARQ-NACK to the receiving UE. For example, the transmitting UE may retransmit the PSSCH related to the HARQ-NACK by the maximum number of retransmissions. For example, the maximum number of retransmissions may be configured or preconfigured by the base station or the UE.

According to an embodiment of the present disclosure, when the transmitting UE transmits a PSSCH or sidelink data to the receiving UE by the maximum number of retransmissions, the transmitting UE may terminate the HARQ process related to the PSSCH or sidelink data. In addition, for example, when the receiving UE receives a PSSCH or sidelink data by the maximum number of retransmissions, the receiving UE may flush the HARQ buffer of the HARQ process related to the PSSCH or sidelink data. For example, when all configured PSSCH or sidelink data are transmitted or received through each HARQ process, the corresponding HARQ process may be terminated.

TABLE 5

Agreement on RAN1#98

● Agreements on the number of HARQ (re-)transmissions of a TB (resource allocation mode 2)
   ■ At least for mode 2, (Pre-)configuration can limit the maximum number of HARQ (re-)transmissions of a TB
      ♦ Up to 32
      ♦ FFS the set of values
      ♦ FFS signaling details (UE-specific, resource pool specific, QoS specific, etc.)
      ♦ If no (pre)configuration, the maximum number is not specified Note:
this (pre-)configuration information is NOT intended for the Rx UE For example, referring to Table 5, the transmitting UE may retransmit the initially transmitted MAC PDU based on the HARQ feedback received from the receiving UE. For example, the maximum number of HARQ retransmissions of TB in at least mode 2 may be configured or pre-configured. For example, the maximum number of HARQ retransmissions may be up to 32 times.

In step S1440, the transmitting UE and the receiving UE may terminate the HARQ process. For example, when the receiving UE receives one or more PSSCHs by a pre-configured maximum number of retransmissions, the receiving UE may terminate the corresponding HARQ process. For example, when the transmitting UE retransmits one or more PSSCHs by a pre-configured maximum number of retransmissions, the transmitting UE may terminate the corresponding HARQ process.

Figure 15:
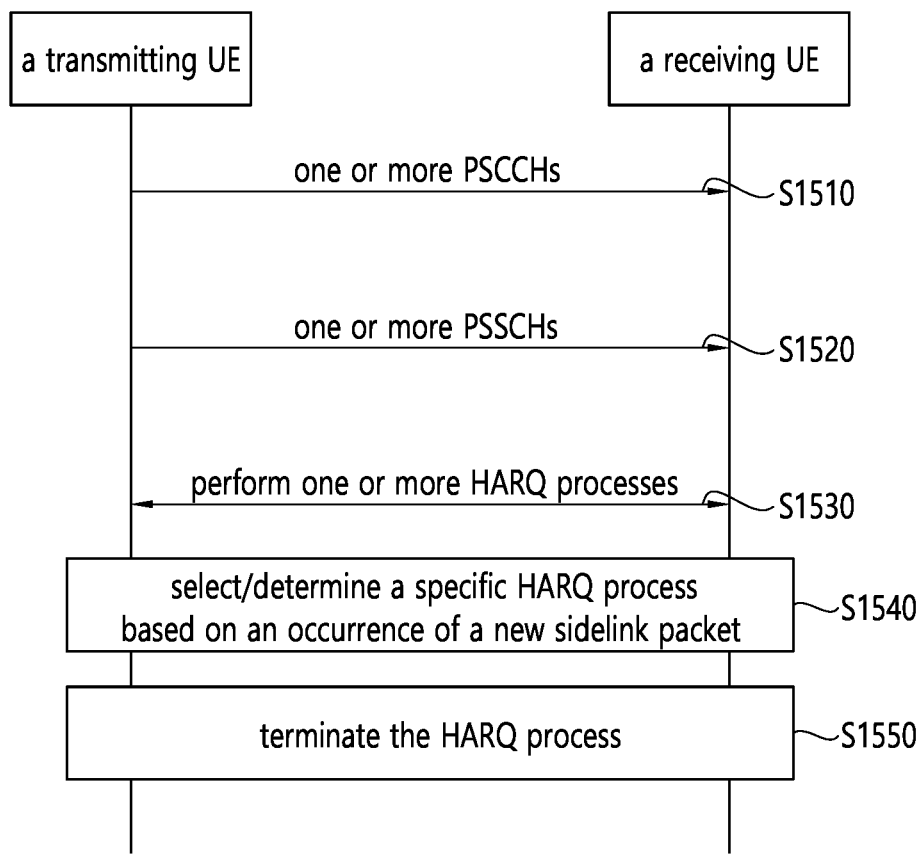
FIG. 15 shows a procedure in which a transmitting terminal terminates a specific HARQ process with a receiving terminal based on an occurrence of a new sidelink packet according to an embodiment of the present disclosure.

FIG. 15 shows a procedure in which a transmitting UE terminates a specific HARQ process with a receiving UE based on an occurrence of a new sidelink packet according to an embodiment of the present disclosure. The embodiment of FIG. 15 may be combined with various embodiments of the present disclosure.

Referring to FIG. 15, in step S1510, the transmitting UE may transmit one or more PSCCHs to the receiving UE. For example, the transmitting UE may transmit sidelink control information to the receiving UE on one or more PSCCHs. In step S1520, the transmitting UE may transmit one or more PSSCHs to the receiving UE. For example, the transmitting UE may transmit a sidelink packet on one or more PSSCHs. For example, the transmitting UE may transmit one or more sidelink packet on one or more PSSCHs. For example, the transmitting UE may transmit one or more PSSCHs related to one or more PSCCHs to the receiving UE. For example, the transmitting UE may transmit one or more PSSCHs related to one or more sidelink control information to the receiving UE.

In step S1530, the transmitting UE and the receiving UE may perform one or more HARQ processes. For example, the receiving UE may perform one or more configured HARQ processes in response to one or more PSSCHs for the transmitting UE.

In step S1540, the transmitting UE and/or the receiving UE may select or determine a specific HARQ process based on an occurrence of a new sidelink packet. In step S1550, the transmitting UE and/or the receiving UE may terminate a specific HARQ process.

According to an embodiment of the present disclosure, if all configured HARQ processes are being performed, when a new sidelink packet transmission or sidelink packet reception occurs, a specific HARQ process may be terminated. For example, the case in which new sidelink packet transmission occurs may be a case in which all HARQ processes managed by the transmitting UE are being performed and a new sidelink packet transmission arrives through the MAC. For example, the case in which new sidelink packet reception occurs may be a case in which all HARQ processes managed by the receiving UE are being performed and a new sidelink packet is received.

For example, the UE may randomly select a specific HARQ process from the currently performed HARQ processes, and the UE may terminate a specific HARQ process. In this case, the implementation of the UE may be simple, but it may be difficult to transmit/receive a sidelink packet with high importance or a sidelink packet that can be easily transmitted/received.

For example, the UE may terminate the least transmitted or received HARQ process among currently performed HARQ processes. That is, for example, a HARQ process that has performed many retransmissions may have a higher success rate of the HARQ process than a HARQ process that has performed few retransmissions.

For example, when HARQ processes are shared based on a cast type or a resource allocation mode in one HARQ entity, the UE may terminate any one HARQ process among HARQ processes related to resource allocation mode 2 in the currently executing HARQ processes. For example, when HARQ processes are shared based on a cast type or a resource allocation mode in one HARQ entity, the UE may not terminate the HARQ process related to resource allocation mode 1 among the currently performed HARQ processes, and the UE may terminate any one HARQ process among HARQ processes related to resource allocation mode 2. For example, this is because a priority of the resource and the HARQ process allocated in the resource allocation mode 1 may be higher than a priority of the resource allocated in the resource allocation mode 2 and the HARQ process.

For example, when HARQ processes are shared based on a cast type or a resource allocation mode in one HARQ entity, the UE may terminate a HARQ process having the lowest priority by comparing priorities of the currently being performed HARQ processes. Herein, for example, the priority may include a priority for each packet or each sidelink radio bearer (SLRB) of the transmitting UE, mapped to each logical channel (LCH). For example, the priority may be a priority included in a SCI received by the receiving UE from the transmitting UE or a priority of the HARQ process. For example, the priority may be a priority of the HARQ process included in a SCI received by the receiving UE from the transmitting UE.

For example, when HARQ processes are shared based on a cast type or a resource allocation mode in one HARQ entity, the UE may compare a priority of the newly transmitted or received packet with a priority of the HARQ process being performed in the past, and the UE may terminate the HARQ process having a lower priority than the priority of the newly transmitted or received packet among the existing HARQ processes.

According to an embodiment of the present disclosure, the transmitting UE may signal an indication bit for a last transmission to the receiving UE. For example, the transmitting UE may inform the receiving UE that there is no further transmission for a specific HARQ process by signaling a bit for the last transmission, and may implicitly instruct that the corresponding HARQ process is terminated. For example, when the receiving UE receives the indication bit for the last transmission, if the receiving UE has already terminated the corresponding HARQ process, the receiving UE may transmit a termination indication for the corresponding HARQ process to the transmitting UE. For example, the transmitting UE may transmit an indication value related to the last PSSCH transmission or the last sidelink data transmission to the receiving UE. For example, the receiving UE may know that there is no longer transmission for the HARQ process related to the indication value based on the indication value, and the receiving UE may implicitly know that the HARQ process related to the indication value has been terminated.

According to various embodiments of the present disclosure described above, the UE can effectively manage the HARQ process for each HARQ entity.

Meanwhile, in the NR sidelink, as groupcast communication is supported, many features that must be supported for groupcast communication may be required. In particular, for autonomous driving and advanced V2X services, a next-generation communication system that requires high reliability and low latency may be required. For example, although a block error rate (BLER), which is typically considered in the conventional communication system, is targeted at $10^{-2}$, the BLER$<<10^{-2}$ may be targeted in a next-generation communication system. For example, the next-generation communication system may require very high reliability because the BLER targets $10^{-5}$. In addition, these services may require very low latency, and there may be a HARQ feedback operation as a feature for very low latency. For example, groupcast communication may be one of the communication methods for V2X along with unicast communication and broadcast communication. For example, there may be two options to support HARQ feedback in groupcast communication. For example, according to option 1, only when the receiving UE fails to receive data from the transmitting UE, the receiving UE may transmit a HARQ-NACK to the transmitting UE. For example, according to option 2, when the receiving UE succeeds in receiving data from the transmitting UE, the receiving UE may transmit a HARQ-ACK to the transmitting UE, and when the receiving UE fails to receive data from the transmitting UE, the receiving UE may transmit a HARQ-NACK to the transmitting UE. Tables 6 and 7 below describe option 1 and option 2 for groupcast HARQ feedback (hereinafter, groupcast option 1 and groupcast option 2).

TABLE 6

RAN1#94 Spokane

Agreements:
When SL HARQ feedback is enabled for groupcast, the following operations are further studied for the non-CBG case:
- o Option 1: Receiver UE transmits HARQ-NACK on PSFCH if it fails to decode the corresponding TB after decoding the associated PSCCH. It transmits no signal on PSFCH otherwise. Details are FFS including the following:
    - ■ Whether to introduce an additional criterion in deciding HARQ-NACK transmission
    - ■ Whether/how to handle DTX issue (i.e., transmitter UE cannot recognize the case that a receiver UE misses PSCCH scheduling PSSCH)
    - ■ Issues when multiple receiver UEs transmit HARQ-NACK on the same resource
        - • How to determine the presence of HARQ-NACK transmissions from receiver UEs
        - • Whether/how to handle destructive channel sum effect of HARQ-NACK transmissions from multiple receiver UEs if the same signal is used
- o Option 2: Receiver UE transmits HARQ-ACK on PSFCH if it successfully decodes the corresponding TB. It transmits HARQ-NACK on PSFCH if it does not successfully decode the corresponding TB after decoding the associated PSCCH which targets the receiver UE. Details are FFS including the following:
    - ■ Whether to introduce an additional criterion in deciding HARQ-ACK/NACK transmission
    - ■ How to determine the PSFCH resource used by each receiver UE
- o FFS whether to support SL HARQ feedback per CBG
- o Other options are not precluded.

TABLE 7

RAN1#96bis

Agreements:
Confirm the following working assumption:
- o When HARQ feedback is enabled for groupcast, support (options as identified in RAN1#95):
    - ■ Option 1: Receiver UE transmits only HARQ NACK
    - ■ Option 2: Receiver UE transmits HARQ ACK/NACK
In HARQ feedback for groupcast,
- o When Option 1 is used for a groupcast transmission, it is supported
    - ■ all the receiver UEs share a PSFCH
    - ■ FFS: a subset of the receiver UEs share a PSFCH
    - ■ FFS: all or a subset of receiver UEs share a pool of PSFCH.
- o When Option 2 is used for a groupcast transmission, it is supported
    - ■ each receiver UE uses a separate PSFCH for HARQ ACK/NACK.
    - ■ FFS: all or a subset of receiver UEs share a PSFCH for ACK transmission and another PSFCH for NACK transmission
- o FFS on which entity and how to allocate PSFCH resource to the receiver UE(s)
- o FFS whether or not to additionally support a mixture of option 1 and option 2 for a groupcast transmission Meanwhile, the UE may need a method of selecting the groupcast option described above in the AS layer. For example, when the AS layer receives group information (e.g., group size, number of group members, group member information, etc.) performing groupcast from an upper layer, the UE may select a groupcast option using the transmitted group information and/or AS layer information. Hereinafter, a method of selecting a groupcast option based on a channel busy ratio (CBR) measured by a UE together with group information transmitted from an upper layer is proposed.

First, referring to Table 8 below, for example, CBR may be a ratio of how much a sidelink-received signal strength indication (S-RSSI) value measured for each sub-channel in the resource pool for 100 ms exceeds a pre-configured threshold value. That is, for example, a high CBR value may mean that the UE's channel condition (e.g., S-RSSI) is not good. Accordingly, transmission parameters may be adjusted in the prior art.

TABLE 8

Channel busy ratio (CBR)

| Definition | Channel busy ratio (CBR) measured in subframe n is defined as follows:<br>- For PSSCH, the portion of sub-channels in the resource pool whose S-RSSI measured by the UE exceed a (pre-)configured threshold sensed over subframes [n-100, n-1];<br>- For PSCCH, in a pool (pre)configured such that PSCCH may be transmitted with its corresponding PSSCH in non-adjacent resource blocks, the portion of tire resources of the PSCCH pool whose S-RSSI measured by the UE exceed a (pre-)configured threshold sensed over subframes [n-100, n-1], assuming that the PSCCH pool is composed of resources with a size of two consecutive PRB pairs in the frequency domain. |
|---|---|

TABLE 8-continued

Channel busy ratio (CBR)

| | |
|---|---|
| Applicable for | RRC_IDLE intra-frequency, RRC_IDLE inter-frequency, RRC_CONNECTED intra-frequency, RRC_CONNECTED inter-frequency |

For example, as in groupcast option 2, an independent feedback resource needs to be allocated to all or some UEs in the group, so the UE may select the groupcast option based on the CBR value. That is, for example, allocating feedback resources to a plurality of UEs may result in an increase in CBR values of a set of feedback resources and an total data channel. Accordingly, by allowing the UE to select a specific group cast option (e.g., group cast option 1) based on the CBR measured by the UE, the UE may adjust the CBR value. Hereinafter, which groupcast option to select based on the CBR value measured by the UE will be described. Herein, for example, the UE selecting the CBR measurement and groupcast option may be a UE transmitting feedback (i.e., HARQ ACK/NACK). For example, the group cast option selected based on the CBR may be indicated through some fields of a predefined channel (e.g., PSCCH). For example, information related to the group cast option may be transmitted together on a data channel (e.g., PSSCH) so that the receiving UE can determine which groupcast option the transmitting UE has selected. For example, a mapping between a specific service and a specific groupcast option may be predefined. For example, the UE may reselect a specific groupcast option in a method suggested below in a predefined rule. That is, for example, service A may be predefined to operate with groupcast option 1. In this case, if the UE selects the groupcast option 2 based on the method proposed below, the UE may ignore the predefined groupcast option 1 and operate as the groupcast option 2.

According to an embodiment of the present disclosure, when the CBR measured by the UE is higher than a pre-configured first threshold value, the UE may select the groupcast option 1. For example, when the CBR value is sufficiently high, it may be configured or defined so that all UEs select the group cast option 1 that can share the same feedback resource. Herein, for example, the pre-configured first threshold value may be a threshold value for a CBR-based groupcast option. For example, the pre-configured first threshold value may be defined as an RRC parameter and may be transmitted as an RRC message in advance.

According to an embodiment of the present disclosure, when the CBR measured by the UE is lower than a pre-configured first threshold, the UE may select the groupcast option 2. For example, when the CBR value is sufficiently low, it may be allowed to allocate independent feedback resources to group member UEs. Herein, for example, the pre-configured first threshold value may be a threshold value for a CBR-based groupcast option. For example, the pre-configured first threshold value may be defined as an RRC parameter and may be transmitted as an RRC message in advance.

According to an embodiment of the present disclosure, the above-described pre-configured first threshold value may be adjusted based on a priority related to transmission of the UE (e.g., a priority mapped to a PDU or a logical channel (LCH) to be transmitted by the UE). For example, a UE having a high priority related to transmission may use group cast option 2 to satisfy more reliable HARQ feedback. For example, a UE having a high transmission-related priority may select a CBR-based groupcast option by increasing a pre-configured first threshold by a specific offset. That is, for example, based on the priority related to transmission, the measured CBR may not be interpreted in the same way. Alternatively, for example, a pre-configured first threshold value may be fixed, and a specific offset may be added to the measured CBR.

For example, on the other hand, in order to induce a UE with a low priority related to transmission to use groupcast option 1, the pre-configured first threshold value may be lowered by a specific offset or a specific offset may be added to the measured CBR.

According to an embodiment of the present disclosure, when the CBR measured by the UE is excessively high, the UE may disable HARQ and perform blind retransmission. Herein, for example, when the UE is a UE that performs HARQ feedback as described above, the UE may be configured or defined as not performing HARQ feedback. For example, the UE transmitting initial data may be configured or defined to disable HARQ and perform blind retransmission. Herein, for example, when the CBR is excessively high, it means that the measured CBR is higher than a pre-configured second threshold value.

According to an embodiment of the present disclosure, for example, for resource allocation mode 1, the base station may select a groupcast option according to the CBR reported from the UE, and the base station may transmit information related to the groupcast option to the UE through control signaling. since the UE in resource allocation mode 1 receives scheduling of initial/retransmission resources from the base station, the base station may select the groupcast option. Herein, for example, in order to help the base station select a groupcast option, the UE may report group information received from a higher layer to the base station. That is, the base station may select a groupcast option based on the reported group information and the reported CBR value. For example, the base station may transmit the selected groupcast option to the UE through control signaling (e.g., PDCCH (DCI), RRC message, system information, etc.).

Meanwhile, in NR SL or NR V2X, the transmitting UE may transmit a PSSCH and/or a PSCCH to the receiving UE, and the receiving UE may transmit a PSFCH to the transmitting UE in response to the PSSCH and/or the PSCCH. Herein, the receiving UE and/or the transmitting UE may determine a resource for transmitting and receiving the PSFCH according to a predefined rule. For convenience of description, a resource for transmitting and receiving PSFCH may be referred to as a PSFCH resource.

Figure 16:
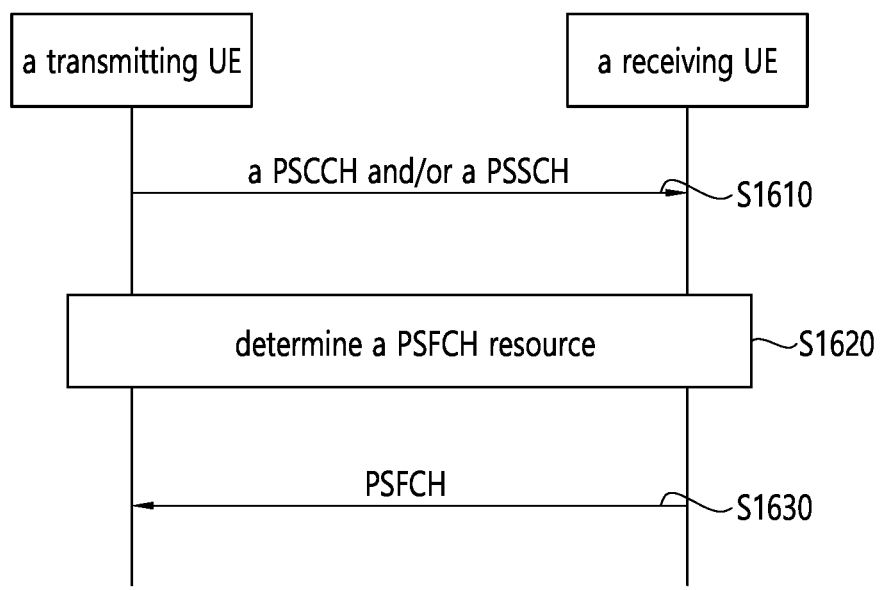
FIG. 16 shows a procedure for transmitting and receiving HARQ feedback by a transmitting terminal and/or a receiving terminal according to an embodiment of the present disclosure.

FIG. 16 shows a procedure for transmitting and receiving HARQ feedback by a transmitting UE and/or a receiving UE according to an embodiment of the present disclosure. The embodiment of FIG. 16 may be combined with various embodiments of the present disclosure.

Referring to FIG. 16, in step S1610, the transmitting UE may transmit a PSCCH and/or a PSSCH to the receiving UE.

In step S1620, the transmitting UE and/or the receiving UE may determine a PSFCH resource based on a predefined rule. For example, the PSFCH resource may be determined based on at least one of a source ID of a transmitting UE, a member ID of a receiving UE, a PSCCH resource, and/or a PSSCH resource. For example, in the case of unicast communication, a member ID (hereinafter, M or $M_{ID}$) for determining a PSFCH resource may be configured to zero.

For example, in the case of groupcast option 1, the $M_{ID}$ for determining the PSFCH resource may be configured to zero. For example, in the case of groupcast option 2, the $M_{ID}$ for determining the PSFCH resource may be configured to a member ID of the receiving UE. Herein, the member ID of the receiving UE may be a group ID assigned to the receiving UE in groupcast communication.

Specifically, the transmitting UE and/or the receiving UE may allocate a PSFCH resource (e.g., PRB) based on the procedure described in Table 9. For example, each PSFCH resource may be related to one or more subchannels related to the PSSCH and one or more slot related to the PSSCH.

TABLE 9

A UE can be indicated by an SCI format scheduling a PSSCH reception, in one or more sub-channels from a number of $N_{subch}^{PSSCH}$ sub-channels, to transmit a PSFCH with HARQ-ACK information in response to the PSSCH reception. The UE provides HARQ-ACK information that includes ACK or NACK, or only NACK.
A UE can be provided, by periodPSFCHresource, a number of slots in a resource pool for a period of PSFCH transmission occasion resources. If the number is zero, PSFCH transmissions from the UE in the resource pool are disabled.
A UE may be indicated by higher layers to not transmit a PSFCH in response to a PSSCH reception [11, TS 38.321].
If a UE receives a PSSCH in a resource pool and a ZYX field in a SCI format 0_2 scheduling the PSSCH reception indicates to the UE to report HARQ-ACK information for the PSSCH reception [5, TS 38.212], the UE provides the HARQ-ACK information in a PSFCH transmission in the resource pool. The UE transmits the PSFCH in a first slot that includes PSFCH resources and is at least a number of slots, provided by MinTimeGapPSFCH, of the resource pool after a last slot of the PSSCH reception.
A UE is provided by rbSetPSFCH a set of $M_{PRB,set}^{PSFCH}$ PRBs in a resource pool for PSFCH transmission in a PRB of the resource pool. For a number of $N_{subch}$ sub-channels for the resource pool, provided by numSubchannel, and a number of $N_{PSSCH}^{PSFCH}$ PSSCH slots associated with a PSFCH slot, provided by periodPSFCHresource, the UE allocates the $[(i + j \cdot N_{PSSCH}^{PSFCH}) \cdot M_{subch,slot}^{PSFCH}, (i + 1 + j \cdot N_{PSSCH}^{PSFCH}) \cdot M_{subch,slot}^{PSFCH} - 1]$ PRBs from the $M_{PRB,set}^{PSFCH}$ PRBs to slot i and sub-channel j, where $M_{subch,slot}^{PSFCH} = M_{PRB,set}^{PSFCH}/(N_{subch} \cdot N_{PSSCH}^{PSFCH})$, $0 \leq i < N_{PSSCH}^{PSFCH}$, $0 \leq j < N_{subch}$, and the allocation starts in an ascending order of i and continues in an ascending order of j. The UE expects that $M_{PRB,set}^{PSFCH}$ is a multiple of $N_{subch} \cdot N_{PSSCH}^{PSFCH}$.
A UE determines a number of PSFCH resources available for multiplexing HARQ-ACK information in a PSFCH transmission as $R_{PRB,CS}^{PSFCH} = N_{type}^{PSFCH} \cdot M_{subch,slot}^{PSFCH} \cdot N_{CS}^{PSFCH}$ where $N_{CS}^{PSFCH}$ is a number of cyclic shift pairs for the resource pool and, based on an indication by higher layers,
- $N_{type}^{PSFCH} = 1$ and the $M_{subch,slot}^{PSFCH}$ PRBs are associated with the starting sub-channel of the corresponding PSSCH
- $N_{type}^{PSFCH} = N_{subch}^{PSSCH}$ and the $N_{subch}^{PSFCH} \cdot M_{subch,slot}^{PSFCH}$ PRBs are associated with one or more sub-channels from the $N_{subch}^{PSSCH}$ sub-channels of the corresponding PSSCH
The PSFCH resources are first indexed according to an ascending order of the PRB index, from the $N_{type}^{PSFCH} \cdot M_{subch,slot}^{PSFCH}$ PRBs, and then according to an ascending order of the cyclic shift pair index from the $N_{CS}^{PSFCH}$ cyclic shift pairs.

35

Furthermore, the transmitting UE and/or the receiving UE may determine a PSFCH resource for transmitting and receiving HARQ feedback based on the procedure described in Table 9.

TABLE 10

A UE determines an index of a PSFCH resource for a PSFCH transmission in response to a PSSCH reception, as $(P_{ID} + M_{ID}) \bmod R_{PRB,CS}^{PSFCH}$ where $P_{ID}$ is a physical layer source ID provided by SCI format 0_2 [5, TS 38.212] scheduling the PSSCH reception, $M_{ID}$ is zero or $M_{ID}$ is the identity of the UE receiving the PSSCH as indicated by higher layers.

In Table 10, the PID may be a source ID of the transmitting UE, the $M_{ID}$ may be an ID of the receiving UE that has received a PSSCH, and $R^{PSCFCH}_{PRB,CS}$ may be the number of available PSFCH resources obtained based on the number of cyclic shift pairs. For example, in a specific cast type or a specific HARQ feedback option, the $M_{ID}$ may be configured to zero. Referring to Table 11, for example, in the case of unicast communication or groupcast option 1, the transmitting UE and/or the receiving UE may determine a PSFCH resource for transmitting and receiving HARQ feedback based on '$M_{ID}=0$'. For example, in the case of groupcast option 2, the transmitting UE and/or the receiving UE may determine a PSFCH resource for transmitting and receiving HARQ feedback based on '$M_{ID}$=member ID of RX UE (receiving UE)'.

TABLE 11

- For the PSFCH candidate resource set with Z PRBs and Y cyclic shift pairs in each PRB,
  - Each PSFCH resource is indexed in the manner of frequency first and cyclic shift second.
    - FFS the order of cyclic shift indexing in a PRB.

TABLE 11-continued

- ○ PSFCH resource with the index ((K+M) mod (Z*Y)) is used for PSFCH transmission of a RX UE.
  - • K is the L1 source ID of the associated PSCCH/PSSCH.
  - • M is 0 for unicast and groupcast feedback option 1 and M is the member ID of the RX UE for groupcast feedback option 2.
- ○ FFS whether to have the following restriction.
  - • Groupcast HARQ feedback option 2 is not used if X > Z*Y (Y denotes the number of PSFCH in a PRB).

Note:
RAN1 assumes that the member ID M is an integer between 0 and X-1.

In the above-described embodiment, the receiving UE should determine an appropriate PSFCH resource by distinguishing between 'unicast or groupcast option 1' and 'groupcast option 2'. However, when the transmitting UE does not transmit a separate indicator (e.g., cast type identification indicator and/or HARQ option identification indicator (ACK/NACK transmission-based or NACK only transmission-based)), the receiving UE cannot explicitly distinguish the cast type and/or HARQ scheme (e.g., groupcast option 1 or groupcast option 2). Accordingly, there is a need to propose a method for a receiving UE to solve the above problem through comparison of an L1 ID or an L2 ID transmitted by a transmitting UE, and an apparatus supporting the same. According to an embodiment of the present disclosure, the receiving UE may determine the cast type (e.g., groupcast, unicast, and/or broadcast) and/or HARQ feedback method (and/or perform related session identification) based on the following rules. Herein, for example, HARQ feedback methods may be distinguished, i) NACK only feedback method in which the UE determines PSFCH resources without using parameters such as group member ID (applied to groupcast) (hereinafter, method 1), ii) ACK/NACK feedback scheme in which the UE determines PSFCH resources without using parameters such as group member ID (applied to unicast) (hereinafter, scheme 2), iii) ACK/NACK feedback scheme in which the UE determines PSFCH resources using parameters such as group member ID (applied to groupcast) (hereinafter, scheme 3). Herein, for example, from the viewpoint of a receiving UE performing PSFCH transmission, method 1 (and/or method 2) and method 3 may need to be distinguished from each other. This is to allow the receiving UE to select an appropriate PSFCH resource at the same time as the receiving UE distinguishes the cast type, so that the receiving UE performs PSFCH transmission with high reliability to the transmitting UE.

For example, when the receiving UE fails to decode data (e.g., PSSCH) (e.g., when the receiving UE needs to transmit NACK information through s PSFCH), the receiving UE may distinguish/determine a cast type (e.g., unicast or groupcast) related to the data by using the L1 ID (e.g., L1 Source ID and/or L1 Destination ID) in the SCI transmitted by the transmitting UE. For example, when the receiving UE fails to decode data (e.g., PSSCH) (e.g., when the receiving UE needs to transmit NACK information through s PSFCH), the receiving UE may distinguish/determine a HARQ feedback method (e.g., the method 1/2 or the method 3) by using the L1 ID (e.g., L1 Source ID and/or L1 Destination ID) in the SCI transmitted by the transmitting UE.

Specifically, for example, the receiving UE may attempt/perform decoding on data (e.g., PSSCH) transmitted by the transmitting UE. Herein, when the receiving UE fails to decode the data, the receiving UE may transmit a NACK feedback to the transmitting UE using a feedback resource (e.g., PSFCH) linked to the data. In this case, even if the receiving UE fails to decode the data, the receiving UE may successfully receive control information (e.g., PSCCH) for scheduling the data. Accordingly, the receiving UE may determine a L1 ID (e.g., L1 source ID and/or L1 destination ID) indicated by a SCI on a PSCCH transmitted by the transmitting UE. On the other hand, since the receiving UE fails to decode data (e.g., PSSCH), a PHY layer of the receiving UE may not be able to transmit data to a MAC layer. Accordingly, the receiving UE cannot obtain the L2 ID, which is the radio layer full ID. Therefore, the receiving UE may perform an operation to distinguish the cast type and/or the HARQ feedback method based on the L1 ID.

For example, in the case of unicast communication, since the L1 ID can be previously exchanged between the transmitting UE and the receiving UE in the process of establishing an upper session (e.g., PC5-S/PC5-RRC), the receiving UE may distinguish/determine the cast type by comparing the previously exchanged ID with the L1 ID. For example, when the previously exchanged ID and the L1 ID match, the receiving UE may determine that the communication between the receiving UE and the transmitting UE is unicast communication.

For example, for groupcast communication, the receiving UE may distinguish/determine the cast type by comparing the L1 destination ID transmitted by the transmitting UE with the destination ID related to the groupcast service in which the receiving UE is interested. For example, when the L1 destination ID transmitted by the transmitting UE matches the destination ID related to the groupcast service of which the receiving UE is interested, the receiving UE may determine that the communication between the receiving UE and the transmitting UE is groupcast communication.

For example, when the receiving UE succeeds in decoding data (e.g., PSSCH) (e.g., when the receiving UE needs to transmit ACK information through a PSFCH), the receiving UE may distinguish/determine a cast type (e.g., unicast or groupcast) related to the data by using a L2 ID (e.g., L2 Source ID and/or L2 Destination ID) in a MAC header and a L1 ID in a SCI transmitted by the transmitting UE. For example, when the receiving UE succeeds in decoding data (e.g., PSSCH) (e.g., when the receiving UE needs to transmit ACK information through a PSFCH), the receiving UE may distinguish/determine a HARQ feedback method (e.g., the method 1/2 or the method 3) by using a L2 ID (e.g., L2 Source ID and/or L2 Destination ID) in a MAC header and a L1 ID in a SCI transmitted by the transmitting UE. Herein, the reason for determining the cast type and/or HARQ feedback method by comparing all L2 IDs when the receiving UE succeeds in decoding the data, is to reduce the error probability when the receiving UE identifies/determines the related cast type information and/or the HARQ feedback method to configure a full ID in consideration of the L2 ID in addition to the L1 ID.

Specifically, for example, the receiving UE may attempt/perform decoding on data (e.g., PSSCH) transmitted by the transmitting UE. Herein, if the receiving UE succeeds in decoding the data, the receiving UE may transmit ACK feedback to the transmitting UE using a feedback resource (e.g., PSFCH) linked to the data. At this time, since the receiving UE has successfully received control information (e.g., PSCCH) for scheduling the data, the receiving UE may also know a L1 ID (e.g., L1 source ID and/or L1 destination ID) indicated by a SCI transmitted by the transmitting UE. In addition, since the PHY layer of the receiving UE can deliver the decoded data to the MAC layer, the receiving UE may configure a MAC PDU, and the receiving UE may acquire the L2 ID, which is the radio layer full ID indicated by the MAC header. Accordingly, the receiving UE may perform an operation of identifying the cast type and/or the HARQ feedback method based on the entire L2 ID.

For example, in the case of unicast communication, since the entire L2 ID can be exchanged between the transmitting UE and the receiving UE in the process of establishing an upper session in advance (e.g., PC5-S/PC5-RRC), the receiving UE may distinguish/determine the cast type by comparing the previously exchanged ID with the entire L2 ID. For example, when the ID exchanged in advance and the entire L2 ID match, the receiving UE may determine that the communication between the receiving UE and the transmitting UE is unicast communication.

For example, for groupcast communication, the receiving UE may distinguish/determine the cast type by comparing the entire L2 destination ID transmitted by the transmitting UE with the destination ID related to the groupcast service in which the receiving UE is interested. For example, if the entire L2 destination ID transmitted by the transmitting UE matches the destination ID related to the groupcast service of which the receiving UE is interested, the receiving UE may determine that the communication between the receiving UE and the transmitting UE is groupcast communication.

In addition, through the identification method according to the ID as described above, the receiving UE may distinguish between method 1 (and/or method 2) and method 3. For example, if the source/destination IDs all match with the previously exchanged source/destination IDs, the receiving UE may select method 1 (and/or method 2). And, the receiving UE may perform HARQ operation based on method 1 (and/or method 2). On the other hand, among UEs that have not exchanged IDs in advance, when the receiving UE is determined as an interested destination ID through only destination ID comparison, the receiving UE may select method 3 to perform HARQ operation.

Figure 17:
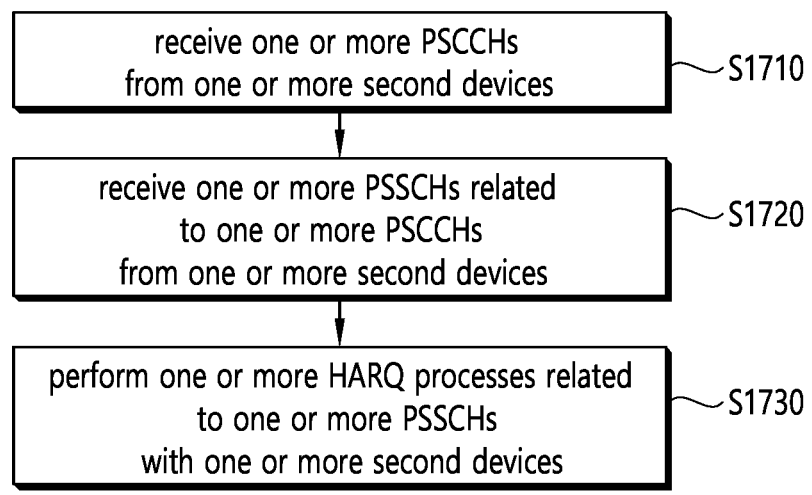
FIG. 17 shows a method for a first device to perform one or more HARQ processes with a second device according to an embodiment of the present disclosure.

FIG. 17 shows a method for a first device to perform one or more HARQ processes with a second device according to an embodiment of the present disclosure. The embodiment of FIG. 17 may be combined with various embodiments of the present disclosure.

Referring to FIG. 17, in step S1710, the first device 100 may receive one or more physical sidelink control channels (PSCCH) from one or more second devices 200. For example, the first device 100 may receive one or more sidelink control information from one or more second devices 200 on one or more PSCCHs.

In step S1720, the first device 100 may receive one or more physical sidelink shared channels (PSSCHs) related to one or more PSCCHs from one or more second devices 200. For example, the first device 100 may receive one or more sidelink data from one or more second devices 200 on one or more PSSCHs related to one or more PSCCHs.

In step S1730, the first device 100 may perform one or more hybrid automatic repeat request (HARQ) processes related to one or more PSSCHs with one or more second devices 200. For example, the first device 100 may transmit a HARQ feedback to the one or more second devices 200 on a physical sidelink feedback channel (PSFCH) related to the one or more PSSCHs in response to the one or more PSSCHs.

For example, one or more HARQ processes may be configured based on at least one of a cast type and a resource allocation mode related to one hybrid automatic repeat request (HARQ) entity. For example, the one or more HARQ processes may be shared based on the at least one of the cast type or the resource allocation mode related to the one HARQ entity. For example, the one or more HARQ processes may be independently configured based on the at least one of the cast type or the resource allocation mode related to the one HARQ entity. For example, a number of the one or more HARQ processes for the at least one of the cast type or the resource allocation mode related to the one HARQ entity may be pre-configured.

For example, the first device 100 may configure one or more HARQ processes based on at least one of a cast type and a resource allocation mode related to one HARQ entity. For example, the first device 100 may share one or more HARQ processes based on at least one of a cast type and a resource allocation mode associated with one HARQ entity. For example, the first device 100 may independently configure one or more HARQ processes based on at least one of a cast type and a resource allocation mode related to one HARQ entity.

For example, the one or more HARQ processes may be terminated based on the one or more second devices receiving a HARQ feedback. For example, the first device 100 may terminate one or more HARQ processes based on the one or more second devices 200 receiving a HARQ feedback. For example, the one or more HARQ processes may terminated based on the first device 100 receiving the one or more PSSCHs from the one or more second devices 200 by a maximum number of retransmissions. For example, the first device 100 may terminate one or more HARQ processes based on the first device 100 receiving one or more PSSCHs from one or more second devices 200 by a maximum number of retransmissions. For example, the maximum number of retransmissions may be configured by a base station or the one or more second devices 200. For example, any one of the one or more HARQ processes may be terminated based on the generation of a new sidelink packet while the one or more HARQ processes are being performed. For example, the first device 100 may terminate any one of the one or more HARQ processes based on the generation of a new sidelink packet while the one or more HARQ processes are being performed. For example, the any one of the one or more HARQ processes may be randomly selected. For example, the first device 100 may randomly select any one of the HARQ processes. For example, the any one of the one or more HARQ process may be a HARQ process with the fewest number of receptions. For example, the first device 100 may select any one of the one or more HARQ process as a HARQ process with the fewest number of receptions. For example, the any one of the one or more HARQ process may be a HARQ process having a lowest priority. For example, the first device 100 may select any one of the one or more HARQ process as a HARQ process having the lowest priority. For example, the priority may be a priority included in a sidelink control information (SCI) received on the one or more PSCCHs. For example, a priority related to the lowest priority may be a priority included in a sidelink control information (SCI) received on the one or more PSCCHs. For example, any one of the one or more HARQ process may be a HARQ process having a lower priority than a priority related to the new sidelink packet. For example, the first device 100 may select any one of the one or more HARQ process as a HARQ process having a lower priority than a priority related to the new sidelink packet.

For example, the first device 100 may receive an indication value on a last PSSCH among the one or more PSSCHs from the one or more second devices 200. For example, the first device 100 may terminate a HARQ process related to the last PSSCH based on the indication value. For example, the indication value may include 1 bit.

The above-described embodiment may be applied to various devices to be described below. First, for example, the processor 102 of the first device 100 may control the transceiver 106 to receive one or more physical sidelink control channels (PSCCH) from one or more second devices 200. And, for example, the processor 102 of the first device 100 may control the transceiver 106 to receive one or more physical sidelink shared channels (PSSCHs) related to one or more PSCCHs from one or more second devices 200. And, for example, the processor 102 of the first device 100 may control the transceiver 106 to perform one or more hybrid automatic repeat request (HARQ) processes related to one or more PSSCHs with one or more second devices 200.

According to an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: receive, from one or more second devices, one or more physical sidelink control channels (PSCCHs), receive, from the one or more second devices, one or more physical sidelink shared channels (PSSCHs) related to the one or more PSCCHs, and perform one or more hybrid automatic repeat request (HARQ) process related to the one or more PSSCHs with the one or more second devices. For example, the one or more HARQ processes may be configured based on at least one of a cast type or a resource allocation mode related to one HARQ entity.

According to an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: receive, from one or more second UEs, one or more physical sidelink control channels (PSCCHs), receive, from the one or more second UEs, one or more physical sidelink shared channels (PSSCHs) related to the one or more PSCCHs, and perform one or more hybrid automatic repeat request (HARQ) process related to the one or more PSSCHs with the one or more second UEs. For example, the one or more HARQ processes may be configured based on at least one of a cast type or a resource allocation mode related to one HARQ entity.

According to an embodiment of the present disclosure, a non-transitory computer-readable storage medium storing instructions may be provided. For example, the instructions, when executed, cause a first device to: receive, from one or more second devices, one or more physical sidelink control channels (PSCCHs), receive, from the one or more second devices, one or more physical sidelink shared channels (PSSCHs) related to the one or more PSCCHs, and perform one or more hybrid automatic repeat request (HARQ) process related to the one or more PSSCHs with the one or more second devices. For example, the one or more HARQ processes may be configured based on at least one of a cast type or a resource allocation mode related to one HARQ entity.

Figure 18:
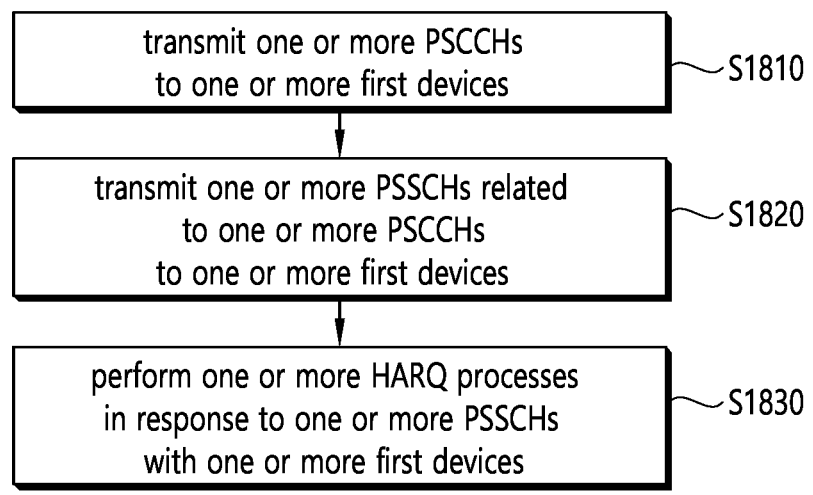
FIG. 18 shows a method for a second device to perform one or more HARQ processes with one or more first devices according to an embodiment of the present disclosure.

FIG. 18 shows a method for a second device to perform one or more HARQ processes with one or more first devices according to an embodiment of the present disclosure. The embodiment of FIG. 18 may be combined with various embodiments of the present disclosure.

Referring to FIG. 18, in step S1810, the second device 200 may transmit one or more PSCCHs to one or more first devices 100. For example, the second device 200 may transmit one or more sidelink control information to one or more first devices 100 on one or more PSCCHs.

In step S1820, the second device 200 may transmit one or more physical sidelink shared channels (PSSCHs) related to one or more PSCCHs to one or more first devices 100. For example, the second device 200 may transmit one or more sidelink data to one or more first devices 100 on one or more PSSCHs related to one or more PSCCHs.

In step S1830, the second device 200 may perform one or more hybrid automatic repeat request (HARQ) processes in response to one or more PSSCHs with one or more first devices 100. For example, the second device 200 may receive HARQ feedback on a physical sidelink feedback channel (PSFCH) related to the one or more PSSCHs in response to one or more PSSCHs from the one or more first devices 100.

For example, one or more HARQ processes may be configured based on at least one of a cast type and a resource allocation mode related to one hybrid automatic repeat request (HARQ) entity. For example, the one or more HARQ processes may be shared based on the at least one of the cast type or the resource allocation mode related to the one HARQ entity. For example, the one or more HARQ processes may be independently configured based on the at least one of the cast type or the resource allocation mode related to the one HARQ entity. For example, a number of the one or more HARQ processes for the at least one of the cast type or the resource allocation mode related to the one HARQ entity may be pre-configured.

For example, the second device 200 may configure one or more HARQ processes based on at least one of a cast type and a resource allocation mode related to one HARQ entity. For example, the second device 200 may share one or more HARQ processes based on at least one of a cast type and a resource allocation mode associated with one HARQ entity. For example, the second device 200 may independently configure one or more HARQ processes based on at least one of a cast type and a resource allocation mode related to one HARQ entity.

For example, the one or more HARQ processes may be terminated based on the one or more first devices 100 transmitting a HARQ feedback. For example, the second device 200 may terminate one or more HARQ processes based on the one or more first devices 100 transmitting a HARQ feedback. For example, the one or more HARQ processes may terminated based on the second device 200 transmitting the one or more PSSCHs to the one or more first devices 100 by a maximum number of retransmissions. For example, the second device 200 may terminate one or more HARQ processes based on the second device 200 transmitting one or more PSSCHs to one or more first devices 100 by a maximum number of retransmissions. For example, the maximum number of retransmissions may be configured by a base station or the one or more second devices 200. For example, any one of the one or more HARQ processes may be terminated based on the generation of a new sidelink packet while the one or more HARQ processes are being performed. For example, the second device 200 may terminate any one of the one or more HARQ processes based on the generation of a new sidelink packet while the one or more HARQ processes are being performed. For example, the any one of the one or more HARQ processes may be randomly selected. For example, the second device 200 may randomly select any one of the HARQ processes. For example, the any one of the one or more HARQ process may be a HARQ process with the fewest number of receptions. For example, the second device 200 may select any one of the one or more HARQ process as a HARQ process with the fewest number of receptions. For example, the any one of the one or more HARQ process may be a HARQ process having a lowest priority. For example, the second device 200 may select any one of the one or more HARQ process as a HARQ process having the lowest priority. For example, the priority may be a priority included in a sidelink control information (SCI) received on the one or more PSCCHs. For example, a priority related to the lowest priority may be a priority included in a sidelink control information (SCI) received on the one or more PSCCHs. For example, any one of the one or more HARQ process may be a HARQ process having a lower priority than a priority related to the new sidelink packet. For example, the second device 200 may select any one of the one or more HARQ process as a HARQ process having a lower priority than a priority related to the new sidelink packet.

For example, the second device 200 may transmit an indication value on a last PSSCH among the one or more PSSCHs to the one or more first devices 100. For example, a HARQ process related to the last PSSCH may be terminated based on the indication value. For example, the indication value may include 1 bit.

The above-described embodiment may be applied to various devices to be described below. First, for example, the processor 202 of the second device 200 may control the transceiver 206 to transmit one or more PSCCHs to one or more first devices 100. And, for example, the processor 202 of the second device 200 may control the transceiver 206 to transmit one or more physical sidelink shared channels (PSSCHs) related to one or more PSCCHs to one or more first devices 100. And, for example, the processor 202 of the second device 200 may control the transceiver 206 to perform one or more hybrid automatic repeat request (HARQ) processes in response to one or more PSSCHs with one or more first devices 100.

According to an embodiment of the present disclosure, a second device configured to perform wireless communication may be provided. For example, the second device may comprise: one or more memories storing instructions; one or more transceivers; and one or more processors connected to the one or more memories and the one or more transceivers. For example, the one or more processors may execute the instructions to: transmit, to one or more first devices, one or more physical sidelink control channels (PSCCHs), transmit, to the one or more first devices, one or more physical sidelink shared channels (PSSCHs) related to the one or more PSCCHs, perform one or more hybrid automatic repeat request (HARQ) process related to the one or more PSSCHs with the one or more second devices. For example, the one or more HARQ processes may be configured based on at least one of a cast type or a resource allocation mode related to one HARQ entity.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 19:
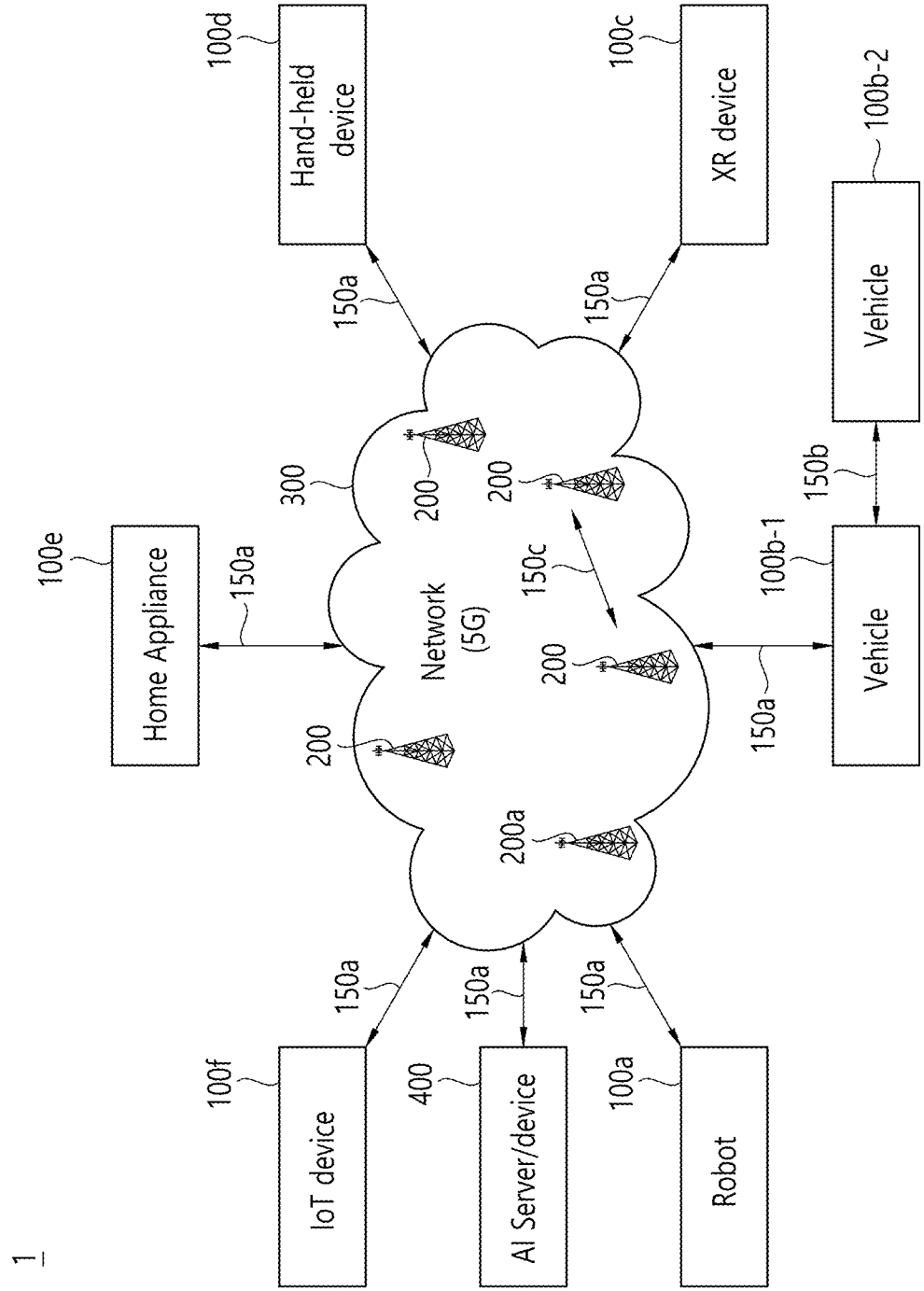
FIG. 19 shows a communication system 1, in accordance with an embodiment of the present disclosure.

FIG. 19 shows a communication system 1, in accordance with an embodiment of the present disclosure.

Referring to FIG. 19, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 20:
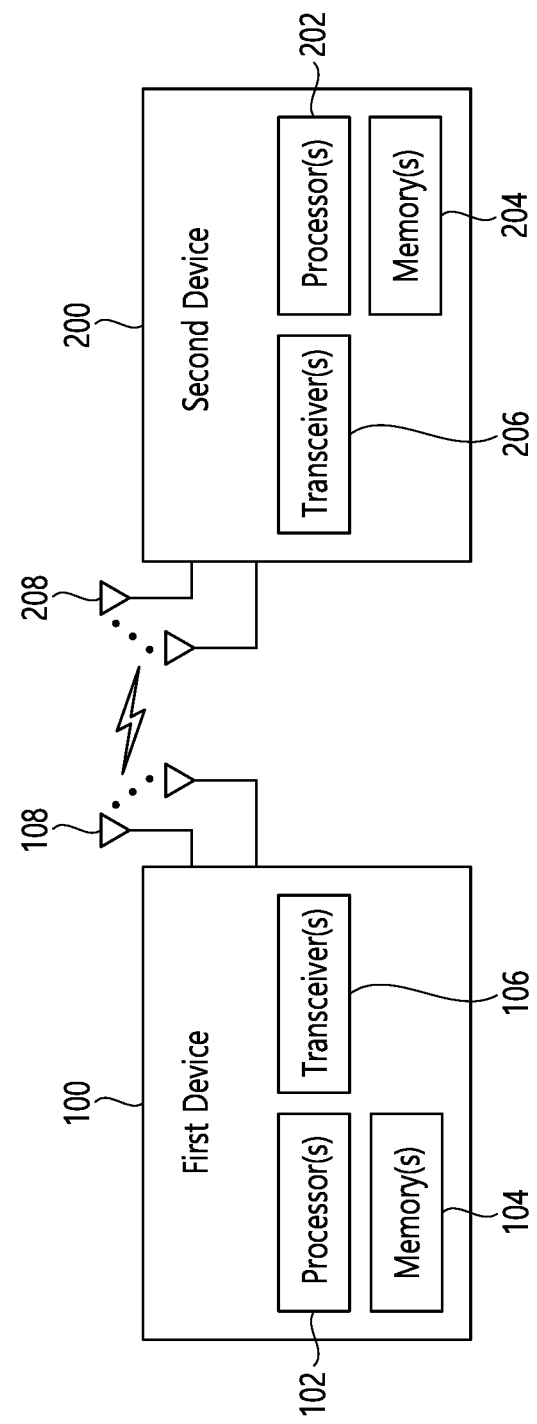
FIG. 20 shows wireless devices, in accordance with an embodiment of the present disclosure.

FIG. 20 shows wireless devices, in accordance with an embodiment of the present disclosure.

Referring to FIG. 20, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 21:
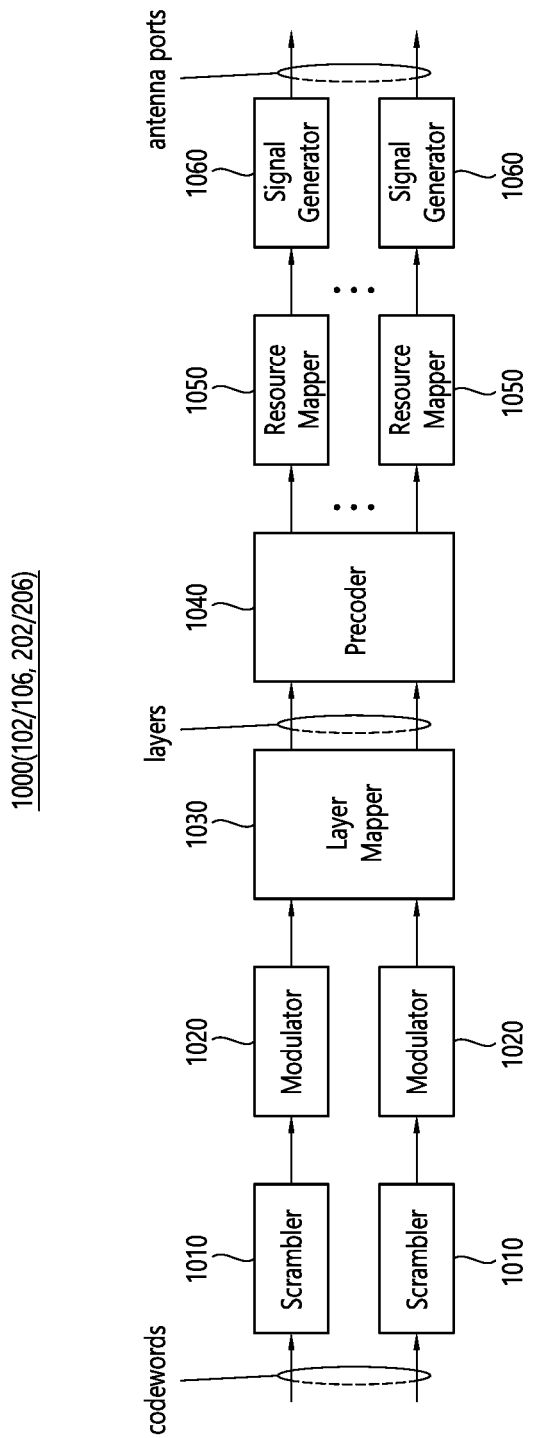
FIG. 21 shows a signal process circuit for a transmission signal, in accordance with an embodiment of the present disclosure.

FIG. 21 shows a signal process circuit for a transmission signal, in accordance with an embodiment of the present disclosure.

Referring to FIG. 21, a signal processing circuit 1000 may include scramblers 1010, modulators 1020, a layer mapper 1030, a precoder 1040, resource mappers 1050, and signal generators 1060. An operation/function of FIG. 21 may be performed, without being limited to, the processors 102 and 202 and/or the transceivers 106 and 206 of FIG. 20. Hardware elements of FIG. 21 may be implemented by the processors 102 and 202 and/or the transceivers 106 and 206 of FIG. 20. For example, blocks 1010 to 1060 may be implemented by the processors 102 and 202 of FIG. 20. Alternatively, the blocks 1010 to 1050 may be implemented by the processors 102 and 202 of FIG. 20 and the block 1060 may be implemented by the transceivers 106 and 206 of FIG. 20.

Codewords may be converted into radio signals via the signal processing circuit 1000 of FIG. 21. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 21. For example, the wireless devices (e.g., 100 and 200 of FIG. 20) may receive radio signals from the exterior through the antenna ports/transceivers. The received radio signals may be converted into baseband signals through signal restorers.

To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 22:
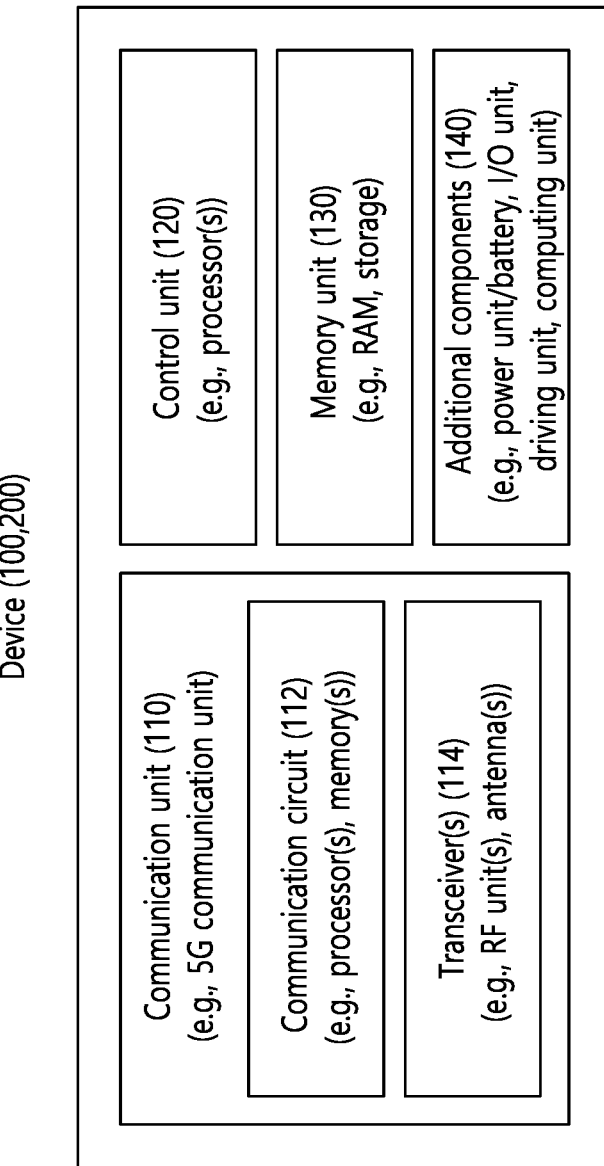
FIG. 22 shows a wireless device, in accordance with an embodiment of the present disclosure.

FIG. 22 shows another example of a wireless device, in accordance with an embodiment of the present disclosure. The wireless device may be implemented in various forms according to a use-case/service (refer to FIG. 19).

Referring to FIG. 22, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 19), the vehicles (100b-1 and 100b-2 of FIG. 19), the XR device (100c of FIG. 19), the hand-held device (100d of FIG. 19), the home appliance (100e of FIG. 19), the IoT device (100f of FIG. 19), a digital broadcast terminal, a hologram device, a public safety device, an MTC device, a medicine device, a fintech device (or a finance device), a security device, a climate/environment device, the AI server/device (400 of FIG. 19), the BSs (200 of FIG. 19), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 22 will be described in detail with reference to the drawings.

Figure 23:
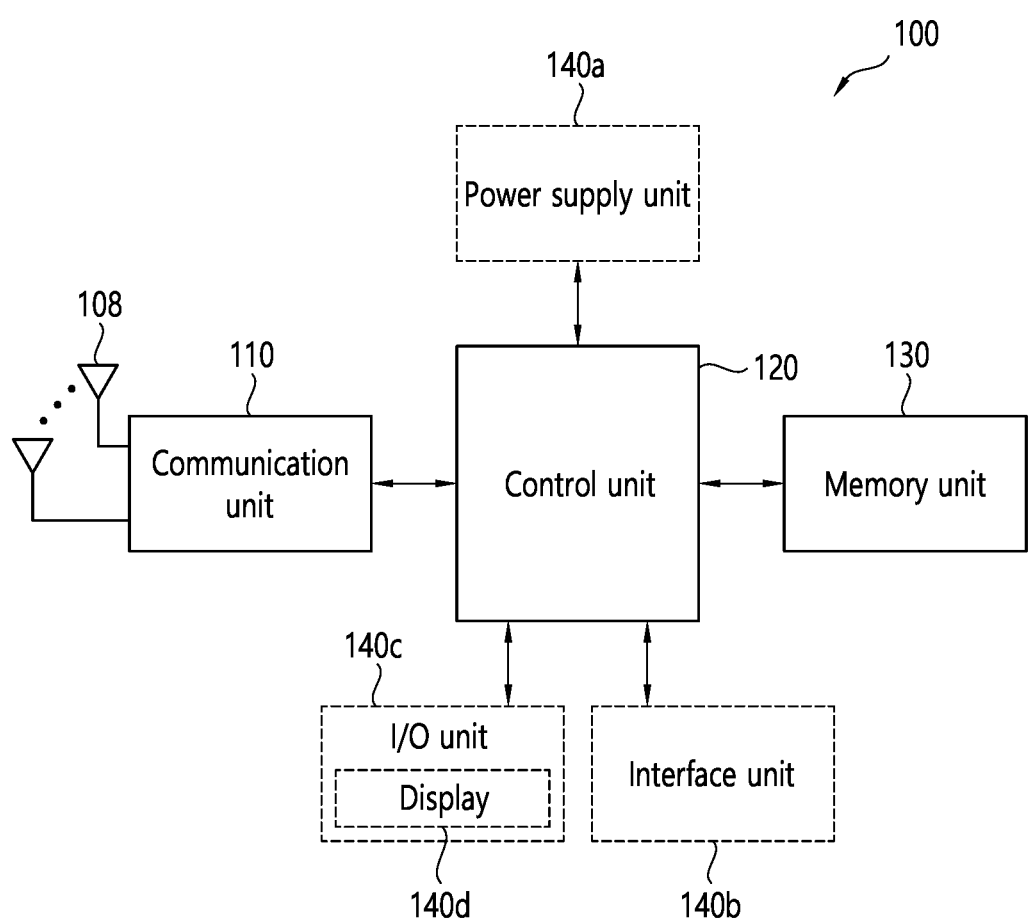
FIG. 23 shows a hand-held device, in accordance with an embodiment of the present disclosure.

FIG. 23 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 23, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 22, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 24:
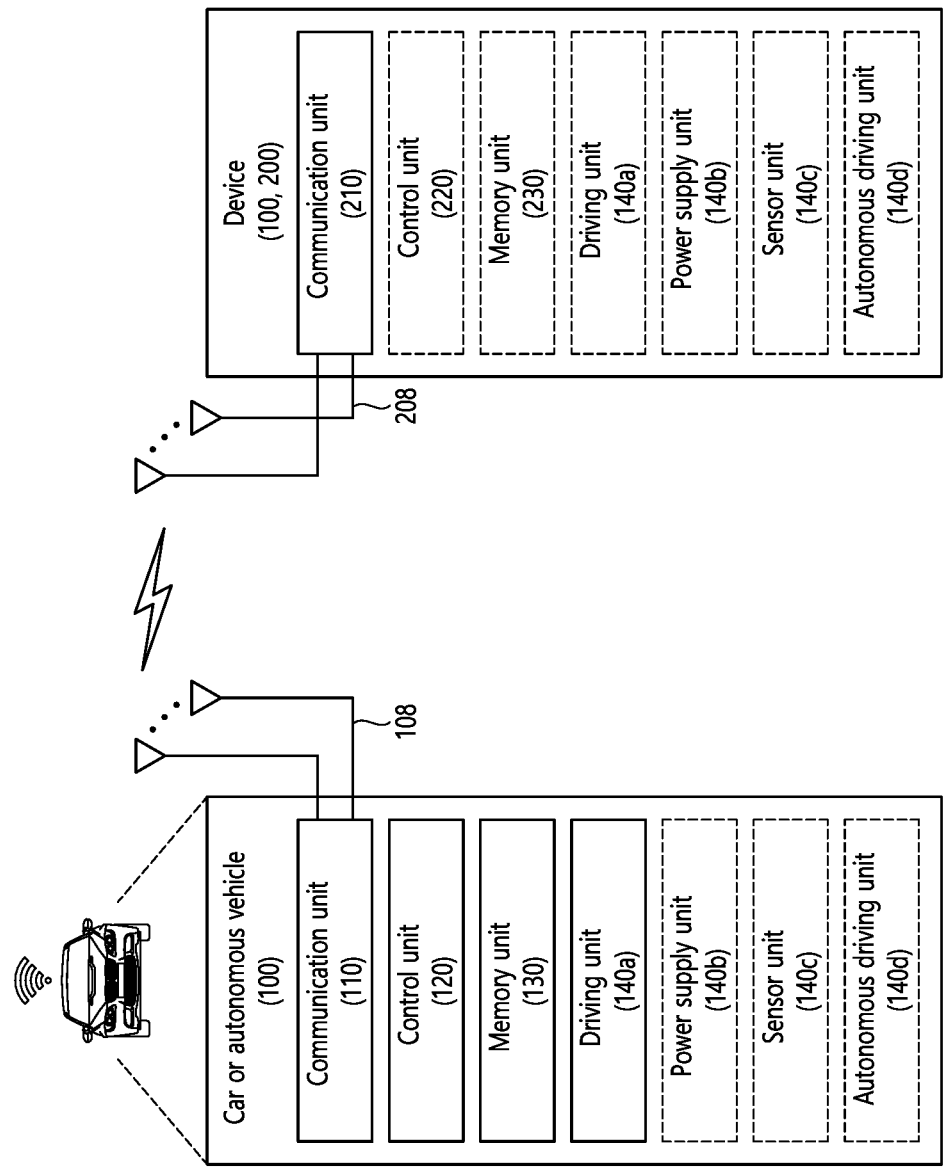
FIG. 24 shows a car or an autonomous vehicle, in accordance with an embodiment of the present disclosure.

FIG. 24 shows a vehicle or an autonomous vehicle, in accordance with an embodiment of the present disclosure.

The vehicle or autonomous vehicle may be implemented by a mobile robot, a car, a train, a manned/unmanned Aerial Vehicle (AV), a ship, etc.

Referring to FIG. 24, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 22, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method performed by a first device, the method comprising:
   receiving, from one or more second devices, one or more control channels;
   receiving, from the one or more second devices, one or more shared channels related to the one or more control channels; and
   performing one or more hybrid automatic repeat request (HARQ) processes related to the one or more shared channels with the one or more second devices,
   wherein, based on a generation of a new sidelink packet while the one or more HARQ processes are maintained, a HARQ process among the one or more HARQ processes is terminated, and
   wherein the HARQ process is a randomly selected HARQ process, a HARQ process with a fewest number of receptions, a HARQ process with a lowest priority, or a HARQ process with a lower priority than a priority related to the new sidelink packet.

2. The method of claim 1, wherein the one or more HARQ processes are shared based on at least one of a cast type or a resource allocation mode related to one HARQ entity.

3. The method of claim 1, wherein the one or more HARQ processes are independently configured based on at least one of a cast type or a resource allocation mode related to one HARQ entity.

4. The method of claim 3, wherein a number of the one or more HARQ processes for the at least one of the cast type or the resource allocation mode related to the one HARQ entity is pre-configured.

5. The method of claim 1, wherein the one or more HARQ processes are terminated based on the one or more second devices receiving HARQ feedback.

6. The method of claim 1, wherein the one or more HARQ processes are terminated based on the first device receiving the one or more shared channels from the one or more second devices by a maximum number of retransmissions, and
   wherein the maximum number of retransmissions is configured by a base station or the one or more second devices.

7. The method of claim 1,
   wherein the HARQ process with the lowest priority is selected based on priorities included in control information received on the one or more control channels.

8. The method of claim 1, further comprising:
   receiving an indication value on a last shared channel among the one or more shared channels from the one or more second devices.

9. The method of claim 8, further comprising:
   terminating the HARQ process related to the last shared channel based on the indication value,
   wherein the indication value includes 1 bit.

10. A first device, comprising:
    at least one transceiver;
    at least one processor; and at least one memory connected to the at least one processor and storing instructions that, based on being executed, cause the first device to perform operations comprising:
receiving, from one or more second devices, one or more control channels,
receiving, from the one or more second devices, one or more shared channels related to the one or more control channels; and
performing one or more hybrid automatic repeat request (HARQ) processes related to the one or more shared channels with the one or more second devices,
wherein, based on a generation of a new sidelink packet while the one or more HARQ processes are maintained, a HARQ process among the one or more HARQ processes is terminated, and
wherein the HARQ process is a randomly selected HARQ process, a HARQ process with a fewest number of receptions, a HARQ process with a lowest priority, or a HARQ process with a lower priority than a priority related to the new sidelink packet.

11. The first device of claim 10, wherein the one or more HARQ processes are shared based on at least one of a cast type or a resource allocation mode related to one HARQ entity.

12. The first device of claim 10, wherein the one or more HARQ processes are independently configured based on at least one of a cast type or a resource allocation mode related to one HARQ entity.

13. The first device of claim 12, wherein a number of the one or more HARQ processes for the at least one of the cast type or the resource allocation mode related to the one HARQ entity is pre-configured.

14. The first device of claim 10, wherein the one or more HARQ processes are terminated based on the one or more second devices receiving HARQ feedback.

15. The first device of claim 10, wherein the one or more HARQ processes are terminated based on the first device receiving the one or more shared channels from the one or more second devices by a maximum number of retransmissions, and
wherein the maximum number of retransmissions is configured by a base station or the one or more second devices.

16. The first device of claim 10, wherein the HARQ process with the lowest priority is selected based on priorities included in control information received on the one or more control channels.

17. The first device of claim 10, wherein the operations further comprise receiving an indication value on a last shared channel among the one or more shared channels from the one or more second devices.

18. The first device of claim 17, wherein the operations further comprise terminating the HARQ process related to the last shared channel based on the indication value, and
wherein the indication value includes 1 bit.

19. A processing device adapted to control a first device, the processing device comprising:
at least one processor; and
at least one memory connected to the at least one processor and storing instructions that, based on being executed, cause the first device to perform operations comprising:
receiving, from one or more second devices, one or more control channels;
receiving, from the one or more second devices, one or more shared channels related to the one or more control channels; and
performing one or more hybrid automatic repeat request (HARQ) processes related to the one or more shared channels with the one or more second devices,
wherein, based on a generation of a new sidelink packet while the one or more HARQ processes are maintained, a HARQ process among the one or more HARQ processes is terminated, and
wherein the HARQ process is a randomly selected HARQ process, a HARQ process with a fewest number of receptions, a HARQ process with a lowest priority, or a HARQ process with a lower priority than a priority related to the new sidelink packet.

20. The processing device of claim 19, wherein the HARQ process with the lowest priority is selected based on priorities included in control information received on the one or more control channels.

* * * * *